United States Patent
Park et al.

(10) Patent No.: US 9,291,859 B2
(45) Date of Patent: Mar. 22, 2016

(54) LIQUID CRYSTAL DISPLAY

(71) Applicant: Samsung Display Co., Ltd., Yongin, Gyeonggi-Do (KR)

(72) Inventors: Jung Ho Park, Bucheon-si (KR); Tae Yong Eom, Suwon-si (KR); Soo Jeong Huh, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 280 days.

(21) Appl. No.: 13/826,275

(22) Filed: Mar. 14, 2013

(65) Prior Publication Data
US 2013/0342795 A1 Dec. 26, 2013

(30) Foreign Application Priority Data

Jun. 20, 2012 (KR) .......... 10-2012-0066164
Jul. 17, 2012 (KR) .......... 10-2012-0077975

(51) Int. Cl.
*G02F 1/1335* (2006.01)
*G02F 1/1339* (2006.01)

(52) U.S. Cl.
CPC .......... *G02F 1/1339* (2013.01); *G02F 1/13394* (2013.01); *G02F 1/133512* (2013.01); *G02F 2001/13396* (2013.01)

(58) Field of Classification Search
CPC ............ G02F 1/133512; G02F 1/1339; G02F 1/13394; G02F 2001/13396
USPC ........................................ 349/110, 155–157
See application file for complete search history.

(56) References Cited

U.S. PATENT DOCUMENTS

| 7,525,631 | B2 | 4/2009 | Lee et al. |
| 7,852,450 | B2 | 12/2010 | Kim et al. |
| 8,085,366 | B2 | 12/2011 | Chang |
| 8,233,131 | B2 * | 7/2012 | Onishi et al. .................. 349/157 |
| 2004/0169797 | A1 * | 9/2004 | Fujita et al. .................. 349/110 |
| 2005/0128382 | A1 | 6/2005 | Baek et al. |

(Continued)

FOREIGN PATENT DOCUMENTS

| JP | 11352496 A | 12/1999 |
| JP | 2005321495 A | 11/2005 |

(Continued)

OTHER PUBLICATIONS

Extended European Search Report for Application No. 13160553.7-1904 dated Oct. 7, 2013.

*Primary Examiner* — Thanh-Nhan P. Nguyen
*Assistant Examiner* — Jia Pan
(74) *Attorney, Agent, or Firm* — Cantor Colburn LLP

(57) ABSTRACT

A liquid crystal display includes: a first substrate; a second substrate disposed opposite to the first substrate; a light blocking member disposed on one of the first substrate or the second substrate, where the light blocking member is disposed in a display area including a plurality of pixel areas, and the light blocking member includes a plurality of extensions having a predetermined plane shape; and a plurality of first spacers disposed on one of the first substrate and the second substrate and contacting an upper surface of a plurality of thin films disposed on the other of the first substrate and the second substrate, in which the extensions of the light blocking member includes a first extension and a second extension, and the first extension overlaps the first spacers, and the second extension does not overlap the first spacers.

47 Claims, 19 Drawing Sheets

(56) References Cited

U.S. PATENT DOCUMENTS

| | | | |
|---|---|---|---|
| 2005/0140914 A1* | 6/2005 | Sawasaki et al. | 349/155 |
| 2005/0179853 A1* | 8/2005 | Chen et al. | 349/155 |
| 2009/0115954 A1* | 5/2009 | Tseng et al. | 349/156 |
| 2010/0001939 A1* | 1/2010 | Ochiai et al. | 345/88 |
| 2010/0300496 A1* | 12/2010 | Souza | 134/104.4 |
| 2010/0302496 A1 | 12/2010 | Zhao | |
| 2011/0043486 A1* | 2/2011 | Hagiwara et al. | 345/175 |
| 2011/0211145 A1* | 9/2011 | Tsuruma et al. | 349/106 |
| 2011/0222016 A1* | 9/2011 | Kaneko et al. | 349/155 |
| 2011/0299002 A1* | 12/2011 | Won et al. | 349/43 |
| 2011/0304809 A1* | 12/2011 | Nakahara et al. | 349/143 |
| 2012/0019748 A1* | 1/2012 | Kim et al. | 349/106 |

FOREIGN PATENT DOCUMENTS

| | | |
|---|---|---|
| JP | 2007114686 A | 5/2007 |
| JP | 2009128799 A | 6/2009 |
| JP | 2009210967 A | 9/2009 |
| JP | 2010039332 A | 2/2010 |
| KR | 1020040084457 A | 10/2004 |
| KR | 100698059 B1 | 3/2007 |
| KR | 1020070069461 A | 7/2007 |
| KR | 1020120009782 A | 2/2012 |

* cited by examiner

LIQUID CRYSTAL DISPLAY

This application claims priority to and the benefit of Korean Patent Application No. 10-2012-0066164, filed on Jun. 20, 2012, and Korean Patent Application No. 10-2012-0077975 filed on Jul. 17, 2012, and all the benefits accruing therefrom under 35 U.S.C. §119, the contents of which in their entireties are herein incorporated by reference.

BACKGROUND (a) Field

Exemplary embodiments of the invention relate to a liquid crystal display.

(b) Description of the Related Art

A liquid crystal display, which is one of the most widely used types of flat panel displays, typically includes two panels with field generating electrodes and a liquid crystal layer interposed between the two panels. The liquid crystal display is a display device that controls transmittance of light passing through the liquid crystal layer by applying voltage to the filed generating electrodes to change directions of liquid crystal molecules of the liquid crystal layer.

The two panels, e.g., an upper panel and a lower panel, of the liquid crystal display are typically supported by a spacer disposed between two panels to maintain a cell gap.

In the liquid crystal display, a light blocking member that extends overlapping the spacer may be provided to effectively prevent light leakage due to the spacer.

However, when the light blocking member extends only in a pixel where the spacer is disposed, deterioration of display quality, such as spots, occurs due to a difference in an aperture ratio between the pixel with the spacer and the pixel without the spacer.

SUMMARY

Exemplary embodiments of the invention relate to a liquid crystal display, in which deterioration in display quality such as spots is effectively prevented and a regular cell gap is substantially maintained by reducing a difference in an aperture ratio between a pixel with a spacer and a pixel without a spacer.

An exemplary embodiment of the invention provides a liquid crystal display, including: a first substrate; a second substrate disposed opposite to the first substrate; a light blocking member disposed on one of the first substrate or the second substrate, where the light blocking member is disposed in a display area including a plurality of pixel areas, and the light blocking member includes a plurality of extensions having a predetermined plane shape; and a plurality of first spacers disposed on one of the first substrate and the second substrate and contacting an upper surface of a plurality of thin films disposed on the other of the first substrate and the second substrate, in which the extensions of the light blocking member includes a first extension and a second extension, and the first extension overlaps the first spacers, and the second extension does not overlap the first spacers.

In an exemplary embodiment, a width of the first extension may be substantially the same as a width of the second extension.

In an exemplary embodiment, a width of the first extension may be different from a width of the second extension.

In an exemplary embodiment, the light blocking member may be a black matrix.

In an exemplary embodiment, the first extension and the second extension may be disposed in the same layer as a gate line disposed on the first substrate or disposed in the same layer as a data line disposed on the first substrate.

In an exemplary embodiment, the liquid crystal display may further include a plurality of second spacers disposed on the one of the first substrate and the second substrate and spaced apart at a predetermined distance from the upper surface of the thin films on the other of the first substrate and the second substrate, in which the second extension overlaps the second spacers.

In an exemplary embodiment, heights of the first spacers and the second spacers may be different from each other.

In an exemplary embodiment, widths of the first spacers and the second spacers may be different from each other.

In an exemplary embodiment, the liquid crystal display may further include a first thin film layer overlapped with the first spacer; and a second thin film layer overlapped with the second spacer, in which a height of the first thin film layer may be different from a height of the second thin film layer.

In an exemplary embodiment, heights of the first spacers and the second spacers may be substantially the same as each other.

In an exemplary embodiment, edges of the plurality of extensions of the light blocking member may have plane shapes including a curved line or a straight line.

In an exemplary embodiment, a portion defined by the edges of the plurality of extensions of the light blocking member may have a circular, oval, or polygonal plane shape.

In an exemplary embodiment, the extensions of the light blocking member may be disposed overlapping a plurality of adjacent pixel areas, and an overlapping area of the extensions and a first pixel area of the adjacent pixel areas may be different from an overlapping area of the extensions and a second pixel area of the adjacent pixel area.

According to exemplary embodiments of the invention, a liquid crystal display includes a plurality of light blocking member extensions disposed in a display area including a plurality of pixel areas, some of the plurality of light blocking member extensions are overlapped with the spacer, the other extensions are not overlapped with the spacer, and as a result, it is possible to prevent deterioration in display quality such as spots and maintain a regular cell gap by reducing a difference in an aperture ratio between a pixel with a spacer and a pixel without a spacer.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
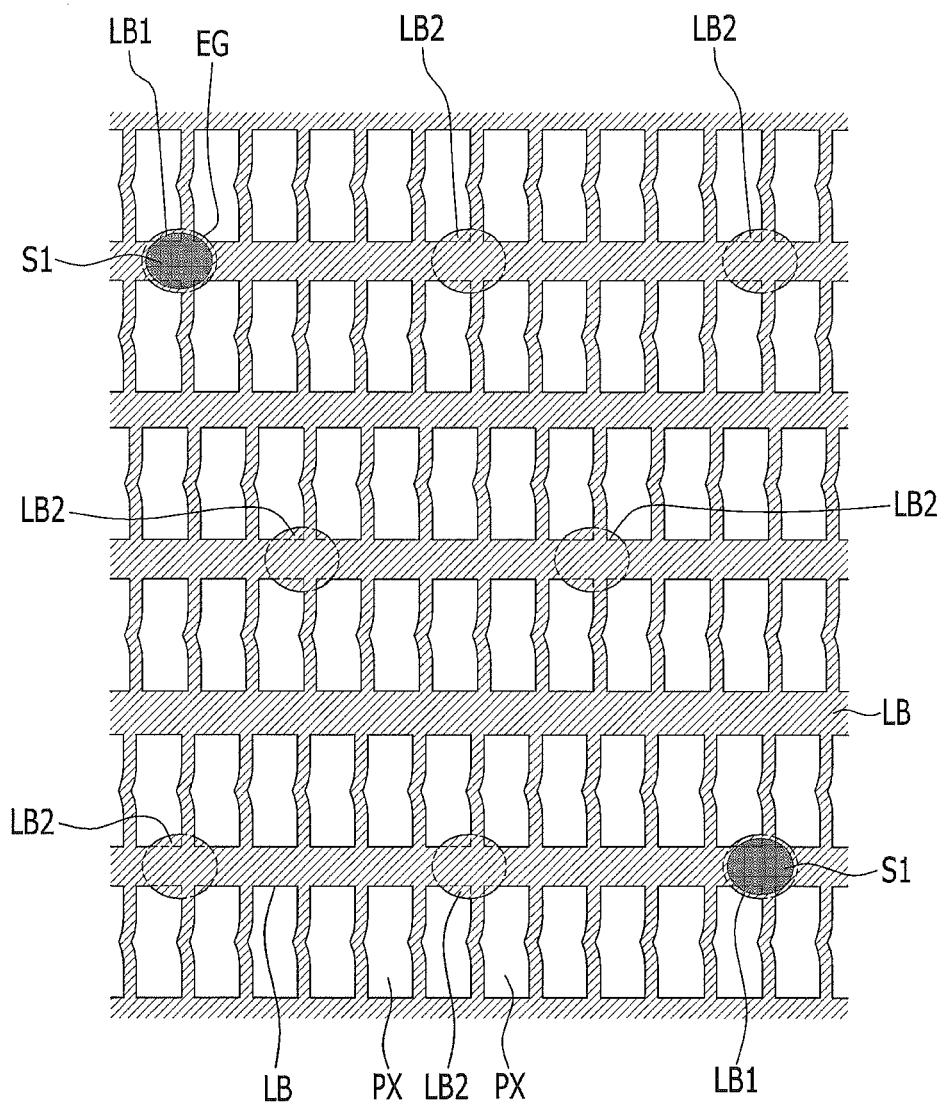
FIG. 1 is a top plan view of a portion of an exemplary embodiment of a liquid crystal display according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice.

Hereinafter, exemplary embodiments of a liquid crystal display according to the invention will be described in detail with reference to the accompanying drawings.

First, an exemplary embodiment of a liquid crystal display according to the invention will be described with reference to

FIG. 1. FIG. 1 is a top plan view of a portion of an exemplary embodiment of a liquid crystal display according to the invention.

Referring to FIG. 1, an exemplary embodiment of the liquid crystal display according to the invention includes a display area including a plurality of pixel areas PX, and a light blocking member LB is disposed in the display area. In an exemplary embodiment, the plurality of pixel areas PX is defined by the light blocking member LB.

The light blocking member LB includes extensions LB1 and LB2 disposed at a portion of the plurality of pixel areas PX. The extensions LB1 and LB2 of the light blocking member include a first extension LB1 which overlaps a first spacer S1 and a second extension LB2 which does not overlap the first spacer S1.

A plane shape of the first extension LB1 is substantially similar to a plane shape of the second extension LB2.

Edges of the first extension LB1 and the second extension LB2 may have plane shapes including a curve, e.g., one or more curves.

In one exemplary embodiment, for example, as illustrated in FIG. 1, referring to a portion represented by a dotted line, a portion of the light blocking member LB surrounded by edges EG of the first extension LB1 and the second extension LB2 of the light blocking member LB has a circular plane shape, but being limited thereto. In an alternative exemplary embodiment of a liquid crystal display according to the invention, a portion of the light blocking member LB surrounded by edges of the first extension LB1 and the second extension LB2 of the light blocking member LB may have an oval shape, for example. The plane shape defined by the edges of the first extension LB1 and the second extension LB2 of the light blocking member LB may be changed based on a plane shape of the first spacer S1.

Then, an arrangement of the extensions of the light blocking member of an exemplary embodiment of the liquid crystal display according to the invention will be described with reference to FIGS. 2 to 5. FIGS. 2 to 5 are plan views illustrating extensions of exemplary embodiments of a light blocking member of the liquid crystal display according to the invention.

Figure 2:
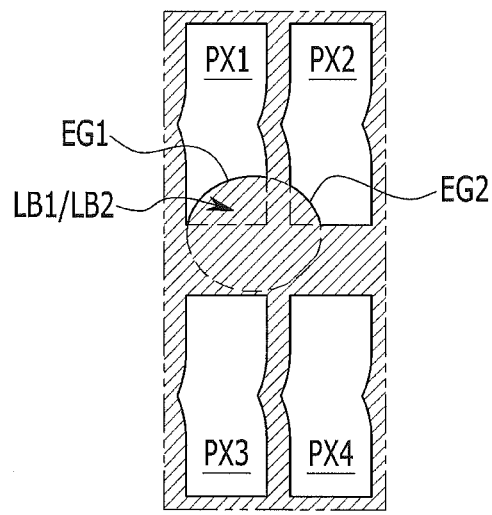
FIGS. 2 to 5 are plan views illustrating an extension of exemplary embodiments of a light blocking member of the liquid crystal display according to the invention.

First, referring to FIG. 2, in an exemplary embodiment, the extensions LB1 and LB2 of the light blocking member LB of the liquid crystal display are disposed overlapping regions of a first pixel PX1 and a second pixel PX2 among four adjacent pixels PX1, PX2, PX3 and PX4, and edges of the extensions LB1 and LB2 have a curved plane shape.

In such an embodiment, a first edge EG1 disposed in the region of the first pixel PX1 and a second edge EG2 disposed in the region of the second pixel PX2 may have different shapes and lengths. In such an embodiment, an area of the extensions LB1 and LB2 of the light blocking member LB disposed in the region of the first pixel PX1 is different from an area of the extensions LB1 and LB2 of the light blocking member LB disposed in the region of the second pixel PX2.

In an alternative exemplary embodiment, the extensions LB1 and LB2 of the light blocking member LB are disposed overlapping the region of the first pixel PX1 and the second pixel PX2 among four adjacent pixels PX1, PX2, PX3, and PX4, and the first edge EG1 disposed in the region of the first pixel PX1 and the second edge EG2 disposed in the region of the second pixel PX2 may be symmetric to each other, and may have shapes and lengths substantially the same as each other. In such an embodiment, an area of the extensions LB1 and LB2 of the light blocking member LB disposed in the region of the first pixel PX1 may be substantially the same as an area of the extensions LB1 and LB2 of the light blocking member LB disposed in the region of the second pixel PX2.

Figure 3:
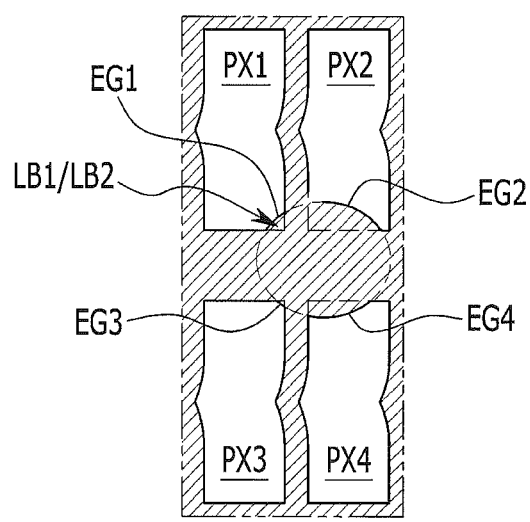
Figure 4:
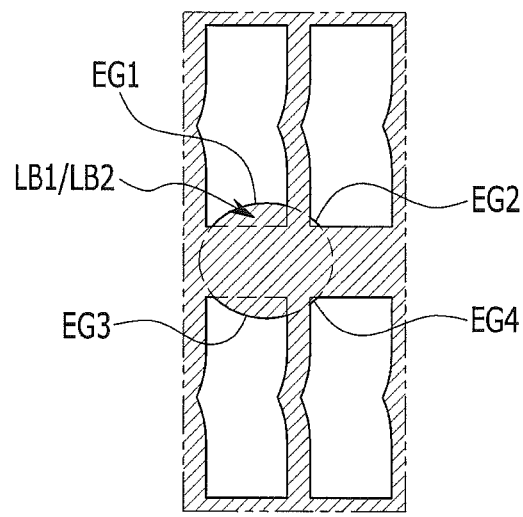

Next, referring to FIGS. 3 and 4, in an alternative exemplary embodiment, the extensions LB1 and LB2 of the light blocking member LB of the liquid crystal display are disposed overlapping the four adjacent pixels PX1, PX2, PX3 and PX4, and the edges of the extensions LB1 and LB2 have curved plane shapes.

In an exemplary embodiment, a first edge EG1 disposed in the region of the first pixel PX1 and a second edge EG2 disposed in the region of the second pixel PX2, a third edge EG3 disposed in the region of the third pixel PX3, and a fourth edge EG4 disposed in the region of the fourth pixel PX4 may different shapes and lengths. In such an embodiment, an area of the extensions LB1 and LB2 of the light blocking member LB disposed in the region of the first pixel PX1, an area of the extensions LB1 and LB2 of the light blocking member LB disposed in the region of the second pixel PX2, an area of the extensions LB1 and LB2 of the light blocking member LB disposed in the region of the third pixel PX3, and an area of the extensions LB1 and LB2 of the light blocking member LB disposed in the region of the fourth pixel PX4 are different from each other.

In an alternative exemplary embodiment, the extensions LB1 and LB2 of the light blocking member LB are disposed overlapping four adjacent pixels PX1, PX2, PX3 and PX4, and a first edge EG1 disposed in the region of the first pixel PX1 and a second edge EG2 disposed in the region of the second pixel PX2, a third edge EG3 disposed in the region of the third pixel PX3, and a fourth edge EG4 disposed in the region of the fourth pixel PX4 may be symmetric to each other and have shapes and lengths substantially the same as each other. In such an embodiment, an area of the extensions LB1 and LB2 of the light blocking member LB disposed in the region of the first pixel PX1, an area of the extensions LB1 and LB2 of the light blocking member LB disposed in the region of the second pixel PX2, an area of the extensions LB1 and LB2 of the light blocking member LB disposed in the region of the third pixel PX3, and an area of the extensions LB1 and LB2 of the light blocking member LB disposed in the region of the fourth pixel PX4 may be substantially the same as each other.

Figure 5:
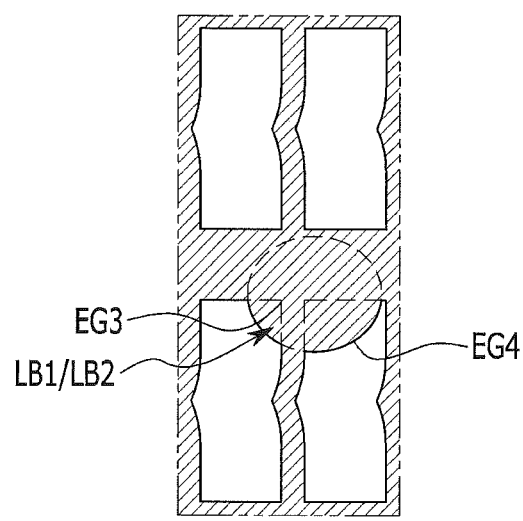

Next, referring to FIG. 5, in another alternative exemplary embodiment, the extensions LB1 and LB2 of the light blocking member LB of the liquid crystal display are disposed in regions of the third pixel PX3 and the fourth pixel PX4 among the four adjacent pixels PX1, PX2, PX3, and PX4, and the edges of the extensions LB1 and LB2 have curved plane shapes.

In such an embodiment, the third edge EG3 disposed in the region of the third pixel PX3 and the fourth edge EG4 disposed in the region of the fourth pixel PX4 have different shapes and lengths. In such an embodiment, an area of the extensions LB1 and LB2 of the light blocking member LB disposed in the region of the third pixel PX3 may be different from an area of the extensions LB1 and LB2 of the light blocking member LB disposed in the region of the fourth pixel PX4.

In another alternative exemplary embodiment, the extensions LB1 and LB2 of the light blocking member LB are disposed overlapping the regions of the third pixel PX3 and the fourth pixel PX4 among the four adjacent pixels PX1, PX2, PX3 and PX4, and the third edge EG3 disposed in the region of the third pixel PX3 and the fourth edge EG4 disposed in the region of the fourth pixel PX4 may be symmetric to each other and have shapes and lengths substantially the same as each other. In such an embodiment, an area of the extensions LB1 and LB2 of the light blocking member LB disposed in the region of the third pixel PX3 and an area of the extensions LB1 and LB2 of the light blocking member LB disposed in the region of the fourth pixel PX4 may be substantially the same as each other.

Although not illustrated, in another alternative exemplary embodiment of the invention, the extensions LB1 and LB2 of the light blocking member LB may be disposed only in the first pixel PX1 and the third pixel PX3 among the four adjacent pixels PX1, PX2, PX3, and PX4, or may be disposed only in the second pixel PX2 and the fourth pixel PX4.

Figure 6:
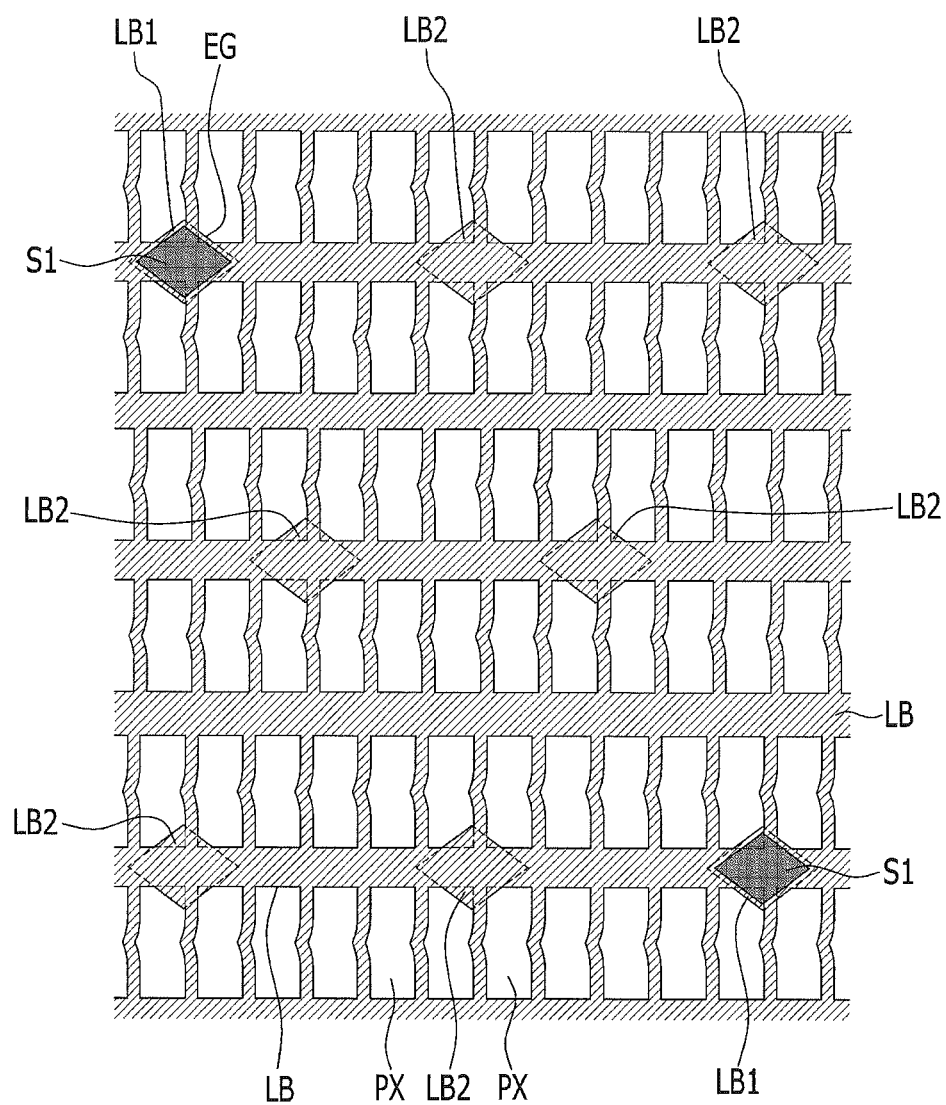
FIG. 6 is a top plan view of a portion of an alternative exemplary embodiment of a liquid crystal display according to the invention.

Then, an alternative exemplary embodiment of a liquid crystal display according to the invention will be described with reference to FIG. 6. FIG. 6 is a top plane view of a portion of an alternative exemplary embodiment of a liquid crystal display according to of the invention.

The liquid crystal display shown in FIG. 6 is substantially the same as the liquid crystal display illustrated in FIG. 1 except for the first and second extensions LB1 and LB2. The same or like elements shown in FIG. 6 have been labeled with the same reference characters as used above to describe the exemplary embodiments of the liquid crystal display shown in FIG. 1, and any repetitive detailed description thereof will hereinafter be omitted or simplified.

In an exemplary embodiment, as shown in FIG. 6, edges of the first extension LB1 and the second extension LB2 may have a plane shape including a straight line, e.g., one or more straight lines. In one exemplary embodiment, for example, as illustrated in FIG. 6 and referring to a portion represented by a dotted line, a plane shape of a portion of the light blocking member LB surrounded by edges EG of the first extension LB1 and the second extension LB2 of the light blocking member LB is a rhombus, and a plane shape of the first spacer S1 overlapping the first extension LB1 may be a rhombus.

In such an embodiment, the plane shapes of the first extension LB1 and the second extension LB2 of the light blocking member LB, and the first spacer S1 in the liquid crystal display may be substantially the same as each other, and a portion surrounded by the edges may have a plane shape including a curved line or a straight line. In one exemplary embodiment, for example, the shapes may be a circle, an oval or a rhombus.

Then, an arrangement of exemplary embodiments of the extensions of the light blocking member of the liquid crystal display according to the invention will be described with reference to FIGS. 7 to 10. FIGS. 7 to 10 are plan views illustrating alternative exemplary embodiments of extensions of a light blocking member of the liquid crystal display according to the invention.

Figure 7:
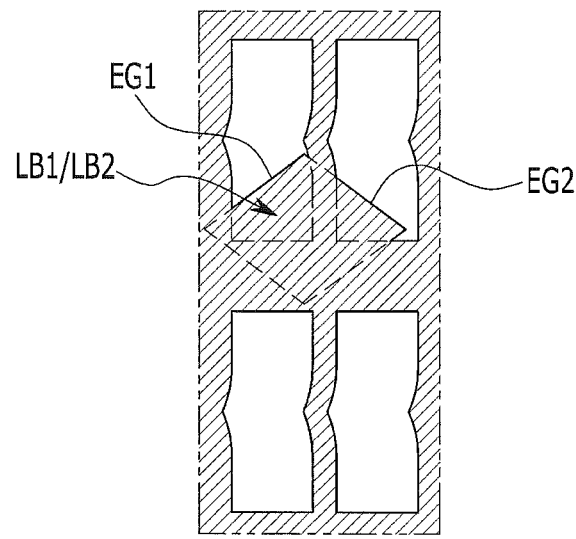
FIGS. 7 to 10 are plan views illustrating an extension of alternative exemplary embodiments of a light blocking member of the liquid crystal display according to the invention.

First, referring to FIG. 7, in an exemplary embodiment, the extensions LB1 and LB2 of the light blocking member LB of the liquid crystal display are disposed overlapping regions of a first pixel PX1 and a second pixel PX2 among four adjacent pixels PX1, PX2, PX3 and PX4, and edges of the extensions LB1 and LB2 have plane shapes including a straight line.

In such an embodiment, a first edge EG1 disposed in the region of the first pixel PX1 and a second edge EG2 disposed in the region of the second pixel PX2 may have different shapes and lengths. In detail, an area of the extensions LB1 and LB2 of the light blocking member LB disposed in the region of the first pixel PX1 is different from an area of the extensions LB1 and LB2 of the light blocking member LB disposed in the region of the second pixel PX2.

However, in the case of a liquid crystal display according to another exemplary embodiment of the present, the extensions LB1 and LB2 of the light blocking member LB are disposed overlapping the region of the first pixel PX1 and the second pixel PX2 among four adjacent pixels PX1, PX2, PX3 and PX4, and the first edge EG1 disposed in the region of the first pixel PX1 and the second edge EG2 disposed in the region of the second pixel PX2 may be symmetric to each other and have shapes and lengths substantially the same as each other. Accordingly, an area of the extensions LB1 and LB2 of the light blocking member LB disposed in the region of the first pixel PX1 may be the same as an area of the extensions LB1 and LB2 of the light blocking member LB disposed in the region of the second pixel PX2.

Figure 8:
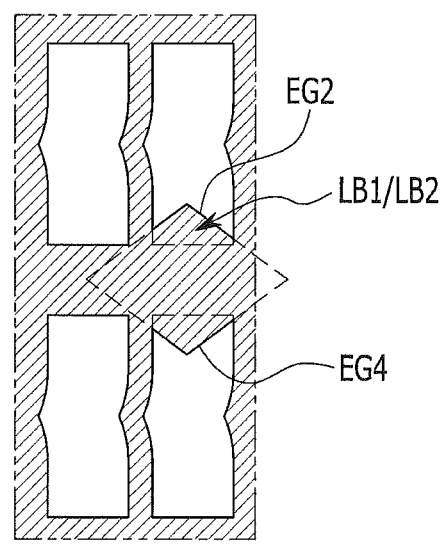

Next, referring to FIG. 8, in an alternative exemplary embodiment, the extensions LB1 and LB2 of the light blocking member LB of the liquid crystal display are disposed overlapping regions of the second pixel PX2 and the fourth pixel PX4 among the four adjacent pixels PX1, PX2, PX3 and PX4, and the edges of the extensions LB1 and LB2 have plane shapes including a straight line.

In such an embodiment, the second edge EG2 disposed in the region of the second pixel PX2 and a fourth edge EG4 disposed in the region of the fourth pixel PX4 may have different shapes and lengths. In such an embodiment, an area of the extensions LB1 and LB2 of the light blocking member LB disposed in the region of the second pixel PX2 is different from an area of the extensions LB1 and LB2 of the light blocking member LB disposed in the region of the fourth pixel PX4.

In another alternative exemplary embodiment of the invention, the extensions LB1 and LB2 of the light blocking member LB are disposed overlapping the regions of the second pixel PX2 and the fourth pixel PX4 among the four adjacent pixels PX1, PX2, PX3 and PX4, and the second edge EG2 disposed in the region of the second pixel PX2 and the fourth edge EG4 disposed in the region of the fourth pixel PX4 may be symmetric to each other and have shapes and lengths substantially the same as each other. In such an embodiment, an area of the extensions LB1 and LB2 of the light blocking member LB disposed in the region of the second pixel PX2 and an area of the extensions LB1 and LB2 of the light blocking member LB disposed in the region of the fourth pixel PX4 may be substantially the same as each other.

Figure 9:
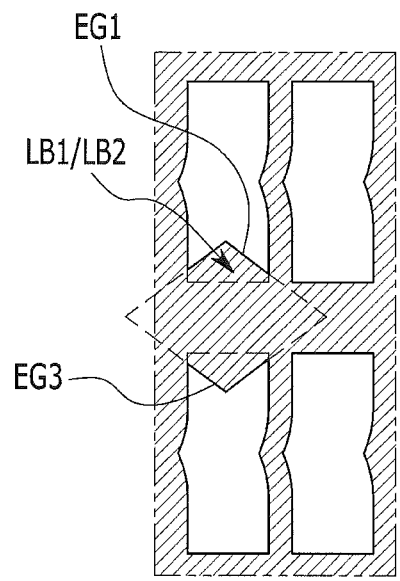

Next, referring to FIG. 9, another alternative exemplary embodiment of the extensions LB1 and LB2 of the light blocking member LB of the liquid crystal display are disposed overlapping regions of the first pixel PX1 and the third pixel PX3 among the four adjacent pixels PX1, PX2, PX3 and PX4, and the edges of the extensions LB1 and LB2 have plane shapes including a straight line.

In such an embodiment, the first edge EG1 disposed in the region of the first pixel PX1 and the third edge EG3 disposed in the region of the third pixel PX3 may have different shapes and lengths. In such an embodiment, an area of the extensions LB1 and LB2 of the light blocking member LB disposed in the region of the first pixel PX1 is different from an area of the extensions LB1 and LB2 of the light blocking member LB disposed in the region of the third pixel PX3.

In another alternative exemplary embodiment of a liquid crystal display according to the invention, the extensions LB1 and LB2 of the light blocking member LB are disposed overlapping the regions of the first pixel PX1 and the third pixel PX3 among the four adjacent pixels PX1, PX2, PX3, and PX4, and the first edge EG1 disposed in the region of the first pixel PX1 and the third edge EG3 disposed in the region of the third pixel PX3 may be symmetric to each other and have shapes and lengths substantially the same as each other. In such an embodiment, an area of the extensions LB1 and LB2 of the light blocking member LB disposed in the region of the first pixel PX1 and an area of the extensions LB1 and LB2 of the light blocking member LB disposed in the region of the third pixel PX3 may be substantially the same as each other.

Figure 10:
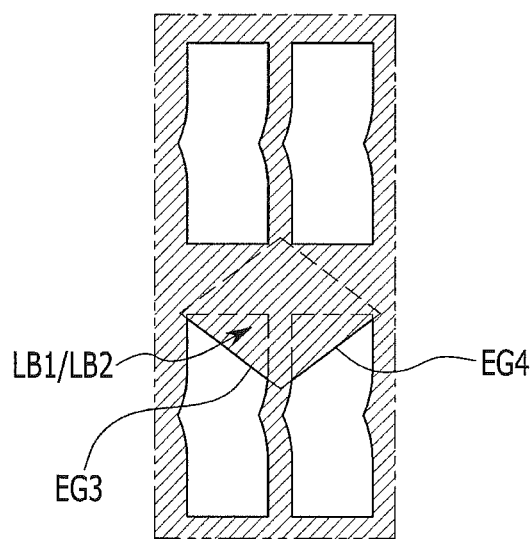

Next, referring to FIG. 10, in another alternative exemplary embodiment, the extensions LB1 and LB2 of the light blocking member LB of the liquid crystal display are disposed overlapping regions of the third pixel PX3 and the fourth pixel PX4 among the four adjacent pixels PX1, PX2, PX3 and PX4, and the edges of the extensions LB1 and LB2 have plane shapes including a straight line.

In such an embodiment, the third edge EG3 disposed in the region of the third pixel PX3 and the fourth edge EG4 disposed in the region of the fourth pixel PX4 may have different shapes and lengths. In such an embodiment, an area of the extensions LB1 and LB2 of the light blocking member LB disposed in the region of the third pixel PX3 is different from an area of the extensions LB1 and LB2 of the light blocking member LB disposed in the region of the fourth pixel PX4.

In another alternative exemplary embodiment of a liquid crystal display according to the invention, the extensions LB1 and LB2 of the light blocking member LB are disposed overlapping the regions of the third pixel PX3 and the fourth pixel PX4 among the four adjacent pixels PX1, PX2, PX3 and PX4, and the third edge EG3 disposed in the region of the third pixel PX3 and the fourth edge EG4 disposed in the region of the fourth pixel PX4 may be symmetric to each other and have shapes and lengths substantially the same as each other. In such an embodiment, an area of the extensions LB1 and LB2 of the light blocking member LB disposed in the region of the third pixel PX3 and an area of the extensions LB1 and LB2 of the light blocking member LB disposed in the region of the fourth pixel PX4 may be substantially the same as each other.

Although not illustrated, in another alternative exemplary embodiment of a liquid crystal display according to the invention, the extensions LB1 and LB2 of the light blocking member LB may be disposed overlapping only the first pixel PX1 and the third pixel PX3 among the four adjacent pixels PX1, PX2, PX3 and PX4, or may be disposed overlapping only the second pixel PX2 and the fourth pixel PX4.

Figure 11:
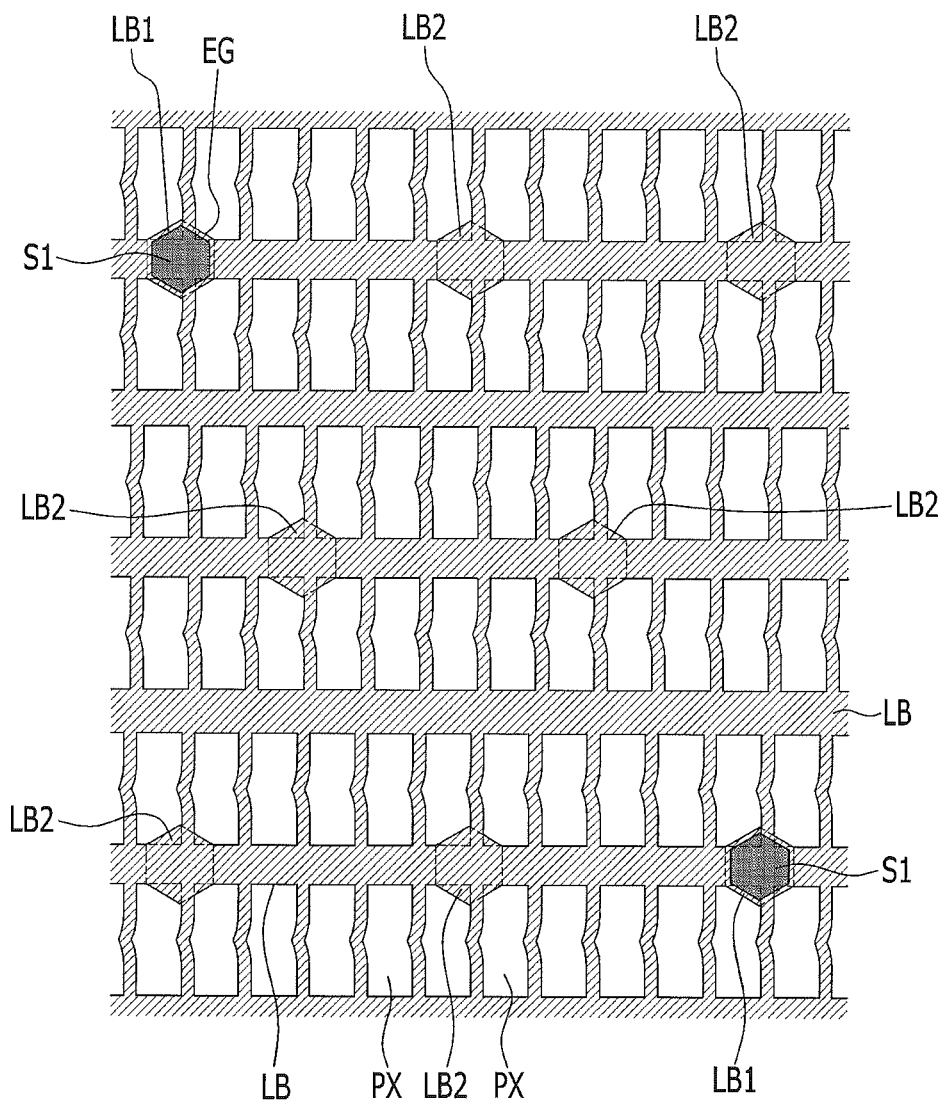
FIG. 11 is a top plan view of a portion of another alternative exemplary embodiment of a liquid crystal display according to the invention.

Then, another alternative exemplary embodiment of a liquid crystal display according to the invention will be described with reference to FIG. 11. FIG. 11 is a top plan view of another alternative exemplary embodiment of a liquid crystal display according to the invention.

The liquid crystal display shown in FIG. 11 is substantially the same as the liquid crystal display illustrated in FIG. 1 except for the first and second extensions LB1 and LB2. The same or like elements shown in FIG. 11 have been labeled with the same reference characters as used above to describe the exemplary embodiments of the liquid crystal display shown in FIG. 1, and any repetitive detailed description thereof will hereinafter be omitted or simplified.

In an exemplary embodiment, edges of the first extension LB1 and the second extension LB2 may have a plane shape including a straight line, e.g., one or more straight lines. In one exemplary embodiment, for example, as illustrated in FIG. 11 and referring to a portion represented by a dotted line, a plane shape of a portion of the light blocking member LB surrounded by edges EG of the first extension LB1 and the second extension LB2 is a hexagon, and a plane shape of the first spacer S1 overlapping the first extension LB1 may be a hexagon, but not being limited thereto. In another alternative exemplary embodiment, the plane shapes of the part of the light blocking member LB surrounded by the edges of the first extension LB1 and the second extension LB2, and the first spacer S1 may be different polygons.

In an exemplary embodiment, the plane shapes of the edges of the first extension LB1 and the second extension LB2 of the light blocking member LB, and the plane shape of the first spacer S1 in the liquid crystal display may be substantially the same as each other, and the shapes may be a circle, an oval, a rhombus or a hexagon. In such an embodiment, the portion defined by the edges of the first extension LB1 and the second extension LB2 of the light blocking member LB, and the edge of the first spacer S1 in the liquid crystal display may have plane shapes including a curved line or a straight line. In one exemplary embodiment, for example, the plane shape may be a circle, an oval or a polygon, such as a rhombus or hexagon.

Figure 12:
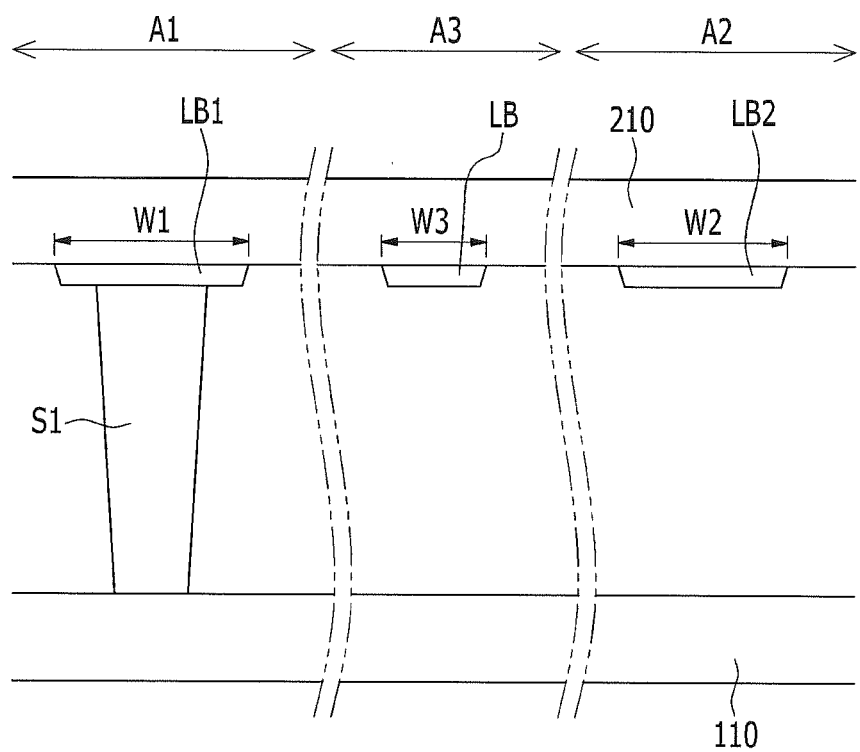
FIG. 12 is a cross-sectional view of portions of an exemplary embodiment of the liquid crystal display according to the invention.

Then, an exemplary embodiment of the liquid crystal display according to the invention will be described with reference to FIG. 12 as well as to FIGS. 1 to 11. FIG. 12 is a cross-sectional view of an exemplary embodiment of the liquid crystal display according to the invention.

In an exemplary embodiment, as shown in FIG. 12, the liquid crystal display includes a first substrate 110 and a second substrate 210 disposed opposite to, e.g., facing, the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

The light blocking member LB, and the first extension LB1 and the second extension LB2 of the light blocking member LB are disposed on, e.g., attached to, the second substrate 210. The first extension LB1 and the second extension LB2 of the light blocking member LB disposed on, e.g., attached to, the second substrate 210 may be extensions of a black matrix.

The first extension LB1 of the light blocking member LB overlaps the first spacer S1, and the second extension LB2 of the light blocking member LB does not overlap the first spacer S1.

As illustrated in FIG. 12, a width W1 of the first extension LB1 of the light blocking member LB and a width W2 of the second extension LB2 are greater than a width W3 of the light blocking member LB. In such an embodiment, the width W1 of the first extension LB1 of the light blocking member LB may be substantially the same as the width W2 of the second extension LB2.

An exemplary embodiment of the liquid crystal display according to the invention has the light blocking member LB including the first extension LB1 and the second extension LB2 disposed in a display area including a plurality of pixel PX areas, and the first extension LB1 of the light blocking member LB overlap the first spacer S1, and the second extension LB2 of the light blocking member LB does not overlap the first spacer S1.

In such an embodiment, deterioration in display quality such as spots is effectively prevented by blocking light leakage that may occur due to the first spacer S1 using the first extension LB1 of the light blocking member LB and a difference in an aperture ratio between the pixel PX including the region A1 with the first spacer S1 and the pixel PX including the region A2 without the first spacer S1 is substantially reduced.

In an exemplary embodiment of the liquid crystal display, the first spacer S1 is disposed on, e.g., attached to, the second substrate 210, but not being limited thereto. In an alternative exemplary embodiment of the liquid crystal display according to the invention, the first spacer S1 may be disposed on, e.g., attached to, the first substrate 110.

Figure 13:
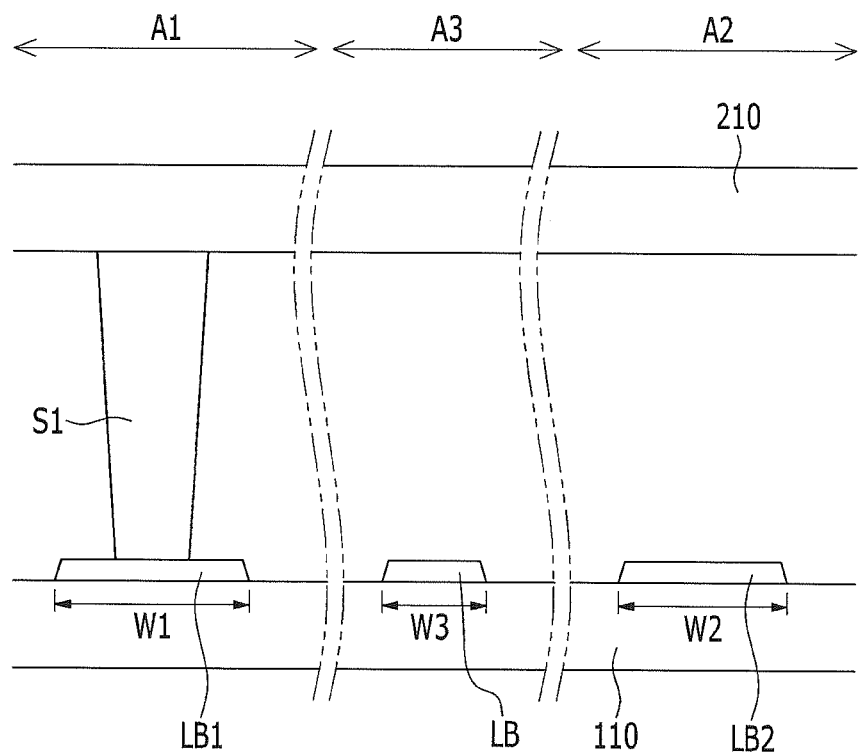
FIG. 13 is a cross-sectional view of portions of an alternative exemplary embodiment of the liquid crystal display according to the invention.

Then, an alternative exemplary embodiment of a liquid crystal display according to the invention will be described with reference to FIG. 13 as well as FIGS. 1 to 11. FIG. 13 is a cross-sectional view of an alternative exemplary embodiment of a liquid crystal display according to the invention.

The exemplary embodiment of the liquid crystal display shown in FIG. 13 is substantially similar to the exemplary embodiment of the liquid crystal display of FIG. 12.

In an exemplary embodiment, as shown in FIG. 13, the liquid crystal display includes a first substrate 110 and a second substrate 210 disposed opposite to, e.g., facing the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

The first extension LB1 of the light blocking member LB overlaps the first spacer S1, and the second extension LB2 of the light blocking member LB does not overlap the first spacer S1.

In an exemplary embodiment, as illustrated in FIG. 13, a width W1 of the first extension LB1 of the light blocking member LB and a width W2 of the second extension LB2 are greater than a width W3 of the light blocking member LB. In such an embodiment, the width W1 of the first extension LB1 of the light blocking member LB may be substantially the same as the width W2 of the second extension LB2.

In an exemplary embodiment of the liquid crystal display, the first extension LB1 and the second extension LB2 of the light blocking member LB are disposed on, e.g., attached to, the first substrate 110. In such an embodiment, although not illustrated, the first extension LB1 and the second extension LB2 of the light blocking member LB may be extensions of a gate conductor provided on the same layer as a gate line disposed on the first substrate 110 or a data conductor provided on the same layer as a data line.

In an exemplary embodiment, as shown in FIG. 13, the light blocking member LB disposed in the third region A3 is disposed on, e.g., attached to, the first substrate 110, but not being limited thereto. In another alternative exemplary embodiment of a liquid crystal display according to the invention, the light blocking member LB disposed in the third region A3 may be disposed on, e.g., attached to, the second substrate 210.

In an exemplary embodiment of the liquid crystal display, the first spacer S1 is deposed on, e.g., attached to, the second substrate 210, but not being limited thereto. In an alternative exemplary embodiment of a liquid crystal display according to the invention, the first spacer S1 may be disposed on, e.g., attached to, the first substrate 110.

Other features of the liquid crystal display described above with reference to FIG. 12 may be applied to the exemplary embodiment of the liquid crystal display shown in FIG. 13.

Figure 14:
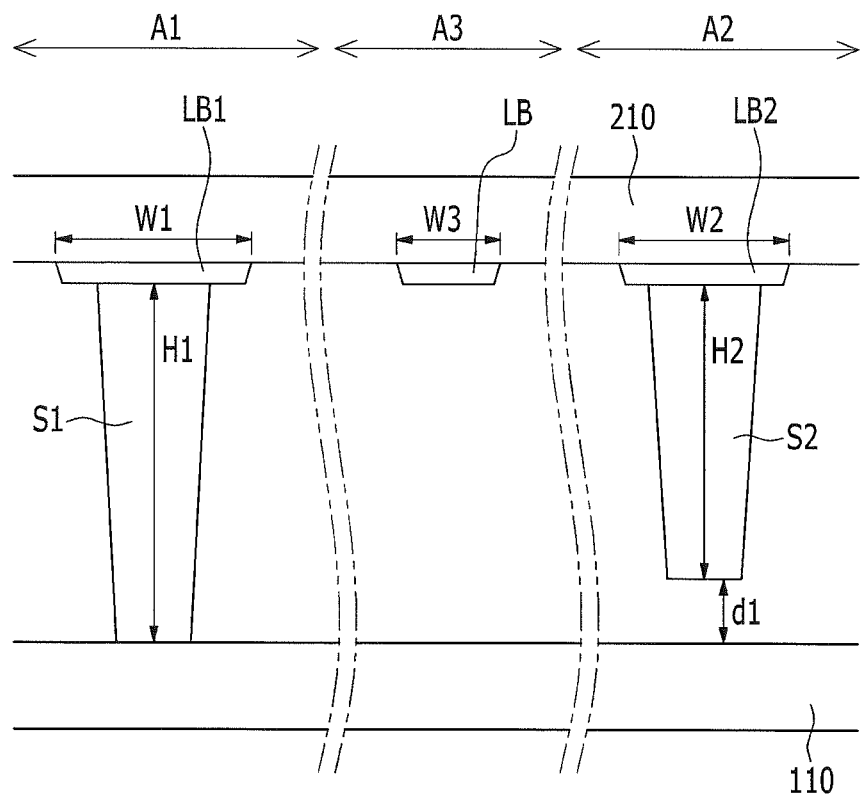
FIG. 14 is a cross-sectional view of portions of another alternative exemplary embodiment of the liquid crystal display according to the invention.

Then, another alternative exemplary embodiment of a liquid crystal display according to the invention will be described with reference to FIG. 14 as well as FIGS. 1 to 11. FIG. 14 is a cross-sectional view of another alternative exemplary embodiment of a liquid crystal display according to the invention.

The exemplary embodiment of the liquid crystal display shown in FIG. 14 is substantially similar to the exemplary embodiments of the liquid crystal display shown in FIG. 12 or 13.

In an exemplary embodiment, as shown in FIG. 14, the liquid crystal display includes a first substrate 110 and a second substrate 210 disposed opposite to, e.g., facing the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

As illustrated in FIG. 14, in such an embodiment, a width W1 of the first extension LB1 of the light blocking member LB and a width W2 of the second extension LB2 are greater than a width W3 of the light blocking member LB. In such an embodiment, the width W1 of the first extension LB1 of the light blocking member LB may be substantially the same as the width W2 of the second extension LB2.

In an exemplary embodiment of the liquid crystal display, the first extension LB1 of the light blocking member LB overlaps the first spacer S1, and at least a portion of the second extension LB2 of the light blocking member LB overlaps the second spacer S2.

The first spacer S1 contacts the first substrate 110 and the first extension LB1 on the second substrate 210 disposed opposite to, e.g., facing the first substrate 110. In such an embodiment, the second spacer S2 is disposed spaced apart from the first substrate 110 by a first distance d1.

In an exemplary embodiment, as shown in FIG. 14, the first spacer S1 has a first height H1, and the second spacer S2 has a second height H2. In such an embodiment, the first height H1 of the first spacer S1 is greater than the second height H2 of the second spacer S2.

In an alternative exemplary embodiment of the liquid crystal display according to the invention, the height of the first spacer S1 may be less than the height of the second spacer S2. In another alternative exemplary embodiment of the liquid crystal display according to the invention, a width of the first spacer S1 may be different from a width of the second spacer S2, and plane shapes of the first spacer S1 and the second spacer S2 may be different from each other. In such an embodiment, the first spacer S1 and the second spacer S2 may have different widths or the plane shapes.

Other features of the liquid crystal displays described above with reference to FIGS. 12 and 13 may be applied to the exemplary embodiment of the liquid crystal display shown in FIG. 14.

Figure 15:
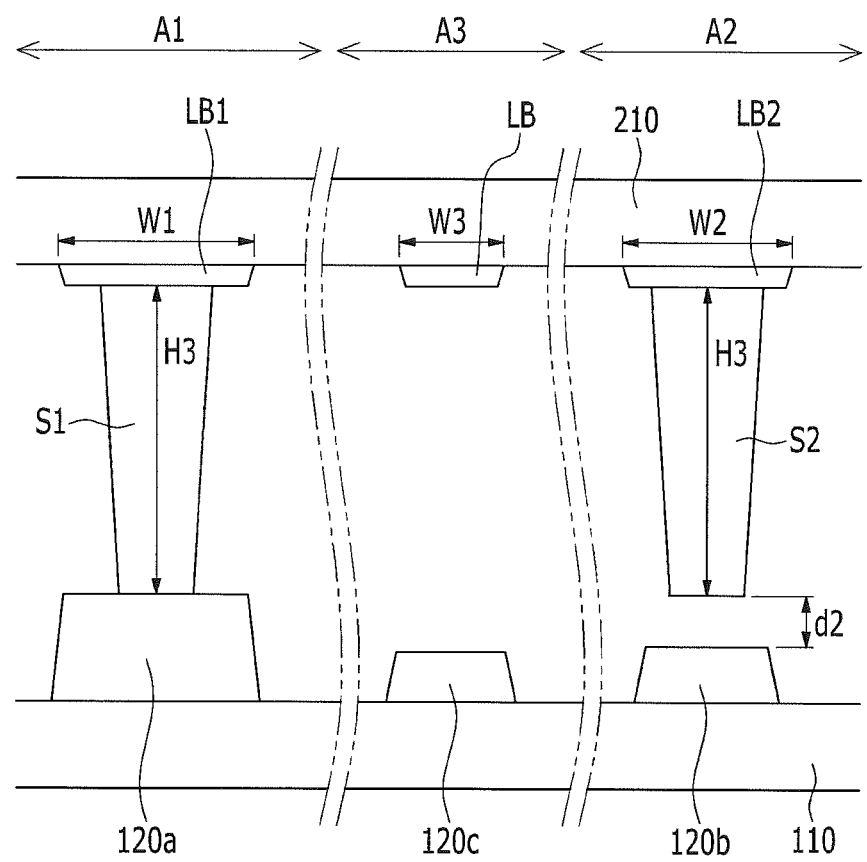
FIG. 15 is a cross-sectional view of portions of another alternative exemplary embodiment of the liquid crystal display according to the invention.

Then, another alternative exemplary embodiment of a liquid crystal display according to the invention will be described with reference to FIG. 15 as well as FIGS. 1 to 11. FIG. 15 is a cross-sectional view of another alternative exemplary embodiment of a liquid crystal display according to the invention.

The exemplary embodiment of the liquid crystal display shown in FIG. 15 is substantially similar to the exemplary embodiment of the liquid crystal display described with reference to FIG. 14.

In an exemplary embodiment, as shown in FIG. 15, the liquid crystal display includes a first substrate 110 and a second substrate 210 disposed opposite to, e.g., facing the first substrate 110. The liquid crystal display includes a first extension LB1 of a light blocking member LB disposed in a first region A1, a second extension LB2 of the light blocking member LB disposed in a second region A2, and the light blocking member LB disposed in a third region A3.

As illustrated in FIG. 15, in such an embodiment, a width W1 of the first extension LB1 of the light blocking member LB and a width W2 of the second extension LB2 are greater than a width W3 of the light blocking member LB. In such an embodiment, the width W1 of the first extension LB1 of the light blocking member LB may be substantially the same as the width W2 of the second extension LB2.

In such an embodiment, the first extension LB1 of the light blocking member LB overlaps the first spacer S1, and at least a portion of the second extension LB2 of the light blocking member LB overlaps the second spacer S2.

The first spacer S1 contacts a layer disposed on the first substrate 110 and the first extension LB1 on the second substrate 210 disposed opposite to, e.g., facing the first substrate 110. In such an embodiment, the second spacer S2 is disposed spaced apart from a top layer on the first substrate 110 by a second distance d2.

In an exemplary embodiment, the first spacer S1 and the second spacer S2 have heights that are substantially the same as each other, e.g., a third height H3.

In an exemplary embodiment, a plurality of thin film layers 120a, 120b and 120c is disposed on the first substrate 110 at a portion facing the first spacer S1 and the second spacer S2. In such an embodiment, a height of the first thin film layer 120a disposed in a first region A1 where the first extension LB1 of the light blocking member LB is disposed is greater than a height of the second thin film layer 120b disposed in a second region A2 where the second extension LB2 of the light blocking member LB is disposed.

In such an embodiment, where the first spacer S1 and the second spacer S2 have the same height, e.g., the third height H3, heights of the thin film layers 120a, 120b and 120c are different from each other, such that the first spacer S1 contacts the thin film layer 120a on the first substrate 110 and the second substrate 210 disposed opposite to, e.g., facing the first substrate 110, and the second spacer S2 is spaced apart from the thin film layer 120b on the first substrate 110 by a second distance d2.

In an alternative exemplary embodiment of the liquid crystal display according to the invention, a height of the first spacer S1 may be different from a height of the second spacer S2. In such an embodiment, a difference in the distance between the first and second spacers S1 and S2 and the first and second thin film layers 120a and 120b on the first substrate 110 opposite thereto may be determined by a step by the height difference of the first spacer S1 and the second spacer S2 and the height difference of the thin film layers 120a, 120b and 120c.

Other features of the liquid crystal displays described above with reference to FIGS. 12 to 14 may be applied to the exemplary embodiment of the liquid crystal display of FIG. 15.

Figure 16:
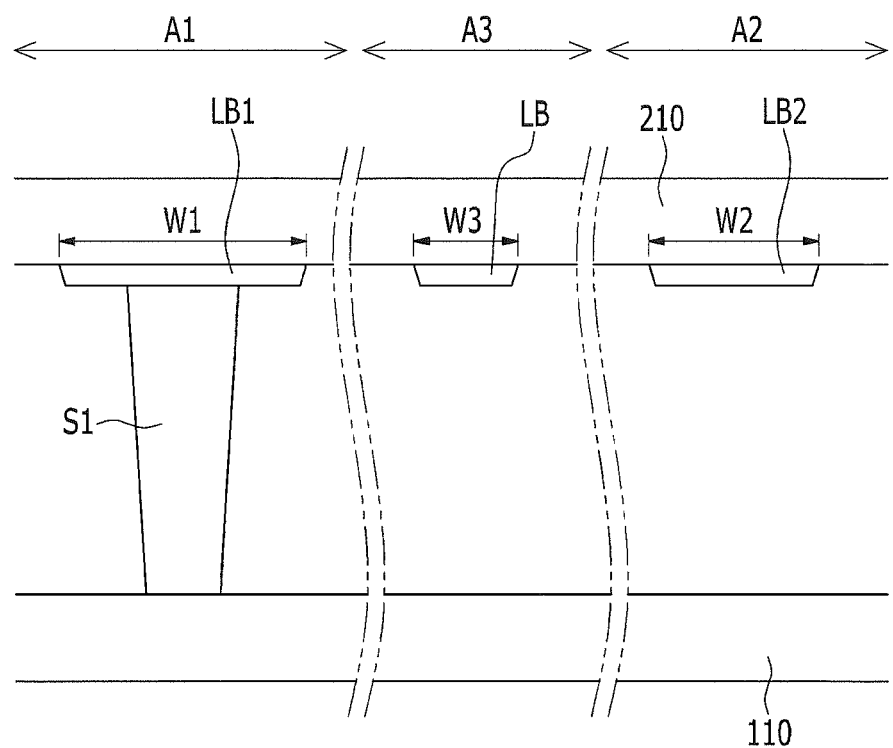
FIG. 16 is a cross-sectional view of portions of another alternative exemplary embodiment of the liquid crystal display according to the invention.

Then, another alternative exemplary embodiment of a liquid crystal display according to the invention will be described with reference to FIG. 16 as well as FIGS. 1 to 11. FIG. 16 is a cross-sectional view of another alternative exemplary embodiment of a liquid crystal display according to the invention.

The exemplary embodiment of the liquid crystal display shown in FIG. 16 is substantially similar to the exemplary embodiment of the liquid crystal display in FIG. 12.

In an exemplary embodiment, as shown in FIG. 16, the liquid crystal display includes a first substrate 110 and a second substrate 210 disposed opposite to, e.g., facing the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

The light blocking member LB, and the first extension LB1 and the second extension LB2 of the light blocking member LB are disposed on, e.g., attached to, the second substrate 210. The first extension LB1 and the second extension LB2 of the light blocking member LB disposed on, e.g., attached to, the second substrate 210 may be extensions of a black matrix.

The first extension LB1 of the light blocking member LB overlaps the first spacer S1, and the second extension LB2 of the light blocking member LB does not overlap the first spacer S1.

In such an embodiment, the width W1 of the first extension LB1 of the light blocking member LB is greater than the width W2 of the second extension LB2. In such an embodiments described above, the width W1 of the first extension LB1 of the light blocking member LB and the width W2 of the second extension LB2 may be greater than the width W3 of the light blocking member LB.

An exemplary embodiment of the liquid crystal display according to the invention has the light blocking member LB including the first extension LB1 and the second extension LB2 disposed in a display area including a plurality of pixel PX areas, and the first extension LB1 of the light blocking member LB overlaps the first spacer S1, and the second extension LB2 of the light blocking member LB does not overlap the first spacer S1.

In such an embodiment, deterioration in display quality such as spots is effectively prevented by blocking light leakage that may occur due to the first spacer S1 using the first extension LB1 of the light blocking member LB and a difference in an aperture ratio between the pixel PX including the region A1 with the first spacer S1 and the pixel PX including the region A2 without the first spacer S1 is substantially reduced.

In an exemplary embodiment of the liquid crystal display, the first spacer S1 is disposed on, e.g., attached to, the second substrate 210, but not being limited thereto. In an alternative exemplary embodiment of the liquid crystal display according to the invention, the first spacer S1 may be disposed on, e.g., attached to, the first substrate 110.

Other features of the liquid crystal displays described above may be applied to the exemplary embodiment of the liquid crystal display of FIG. 16.

Figure 17:
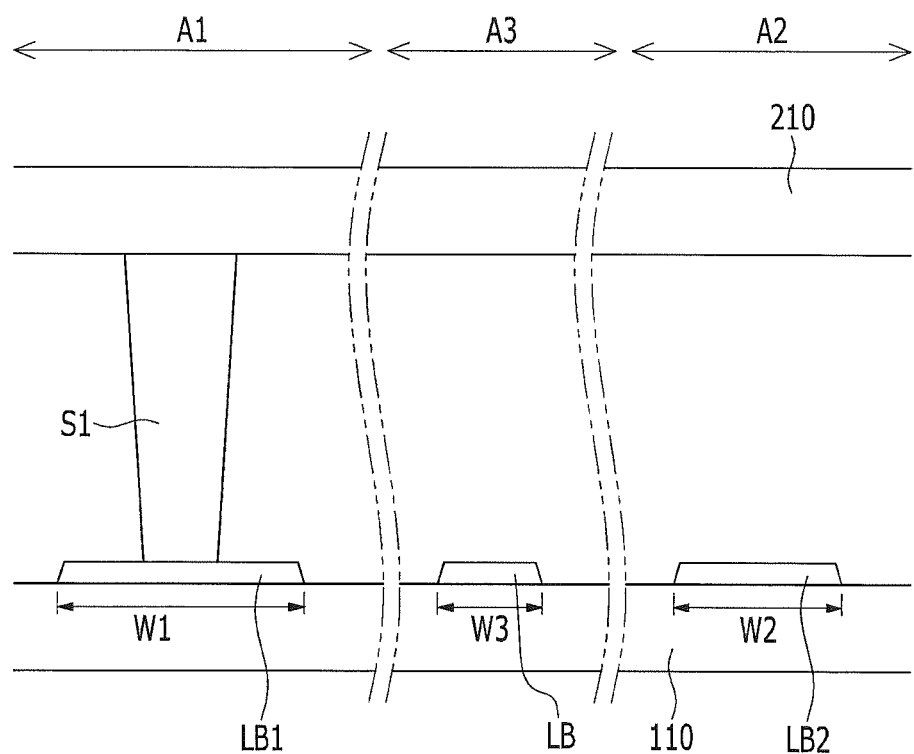
FIG. 17 is a cross-sectional view of portions of another alternative exemplary embodiment of the liquid crystal display according to the invention.

Then, another alternative exemplary embodiment of a liquid crystal display according to the invention will be described with reference to FIG. 17 as well as FIGS. 1 to 11. FIG. 17 is a cross-sectional view of another alternative exemplary embodiment of a liquid crystal display according to the invention.

The exemplary embodiment of the liquid crystal display shown in FIG. 17 is similar to the exemplary embodiment of the liquid crystal display described with reference to FIG. 13.

In an exemplary embodiment, as shown in FIG. 17, the liquid crystal display includes a first substrate 110 and a second substrate 210 disposed opposite to, e.g., facing the first substrate 110. The liquid crystal display includes a first extension LB1 of a light blocking member LB disposed in a first region A1, a second extension LB2 of the light blocking member LB disposed in a second region A2, and the light blocking member LB disposed in a third region A3.

The first extension LB1 of the light blocking member LB overlaps the first spacer S1, and the second extension LB2 of the light blocking member LB does not overlap the first spacer S1.

In an exemplary embodiment of the liquid crystal display, the first extension LB1 and the second extension LB2 of the light blocking member LB are disposed on the first substrate 110. Although not illustrated, the first extension LB1 and the second extension LB2 of the light blocking member LB may be extensions of a gate conductor provided on the same layer as a gate line disposed on the first substrate 110 or a data conductor provided on the same layer as a data line.

In an exemplary embodiment of the liquid crystal display, as shown in FIG. 16, the width W1 of the first extension LB1 of the light blocking member LB is greater than the width W2 of the second extension LB2. In such an embodiment, as described above, the width W1 of the first extension LB1 of the light blocking member LB and the width W2 of the second extension LB2 may be greater than the width W3 of the light blocking member LB.

In an exemplary embodiment, as shown in FIG. 16, the light blocking member LB disposed in the third region A3 is disposed on, e.g., attached to, the first substrate 110. In an alternative exemplary embodiment, of a liquid crystal display according to the invention, the light blocking member LB disposed in the third region A3 may be disposed on, e.g., attached to, the second substrate 210, not the first substrate 110.

In an exemplary embodiment of the liquid crystal display, the first spacer S1 is disposed on, e.g., attached to, the second substrate 210, but not being limited thereto. In an alternative exemplary embodiment of the liquid crystal display according to the invention, the first spacer S1 may be disposed on, e.g., attached to, the first substrate 110.

Other features of the liquid crystal displays described above may be applied to the exemplary embodiment of the liquid crystal display of FIG. 17.

Figure 18:
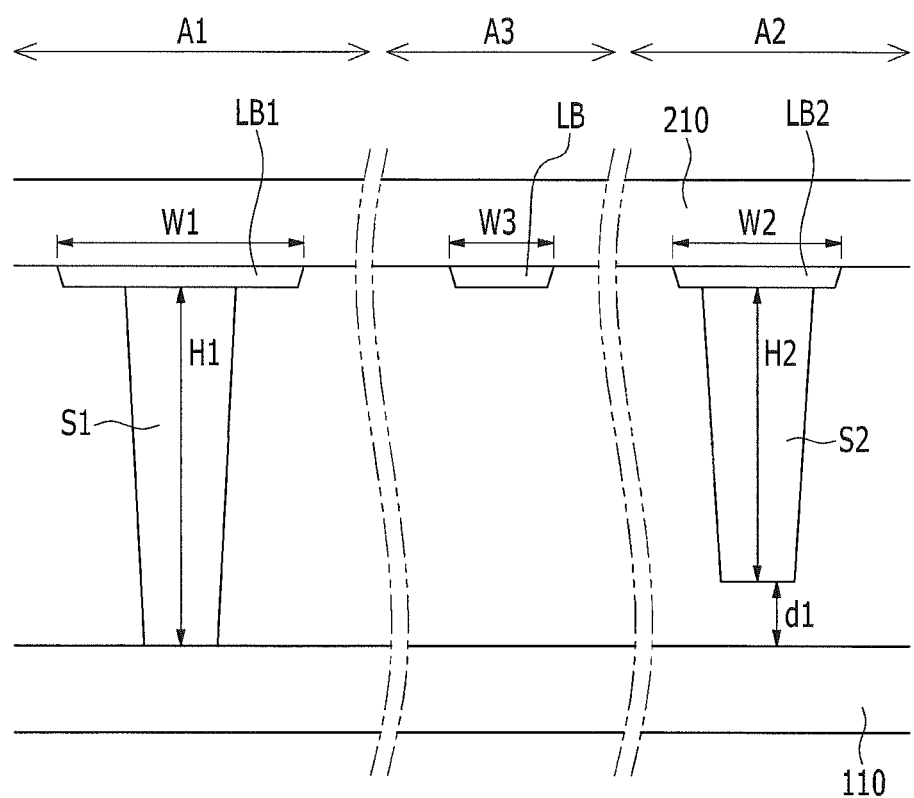
FIG. 18 is a cross-sectional view of portions of another alternative exemplary embodiment of the liquid crystal display according to the invention.

Then, another alternative exemplary embodiment of a liquid crystal display according to the invention will be described with reference to FIG. 18 as well as FIGS. 1 to 11. FIG. 18 is a cross-sectional view of another alternative exemplary embodiment of a liquid crystal display according to the invention.

The exemplary embodiment of the liquid crystal display shown in FIG. 18 is similar to the exemplary embodiment of the liquid crystal display described with reference to FIG. 14.

In an exemplary embodiment, as shown in FIG. 18, the liquid crystal display includes a first substrate 110 and a second substrate 210 disposed opposite to, e.g., facing the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

In an exemplary embodiment of the liquid crystal display, the first extension LB1 of the light blocking member LB overlaps the first spacer S1, and at least a portion of the second extension LB2 of the light blocking member LB overlaps the second spacer S2.

The first spacer S1 contacts the first substrate 110 and the second substrate 210 disposed opposite to, e.g., facing the first substrate 110, and the second spacer S2 is disposed spaced apart from the first substrate 110 opposite thereto by a first distance d1.

In an exemplary embodiment, as shown in FIG. 18, the first spacer S1 has a first height H1, and the second spacer S2 has a second height H2. In such an embodiment, the first height H1 of the first spacer S1 is greater than the second height H2 of the second spacer S2.

In such an embodiment, the width W1 of the first extension LB1 of the light blocking member LB is greater than the width W2 of the second extension LB2. In such an embodiment, similarly to the exemplary embodiments of the liquid crystal display described above, the width W1 of the first extension LB1 of the light blocking member LB and the width W2 of the second extension LB2 are greater than the width W3 of the light blocking member LB.

Other features of the liquid crystal displays described above may be applied to the exemplary embodiment of the liquid crystal display of FIG. 18.

Figure 19:
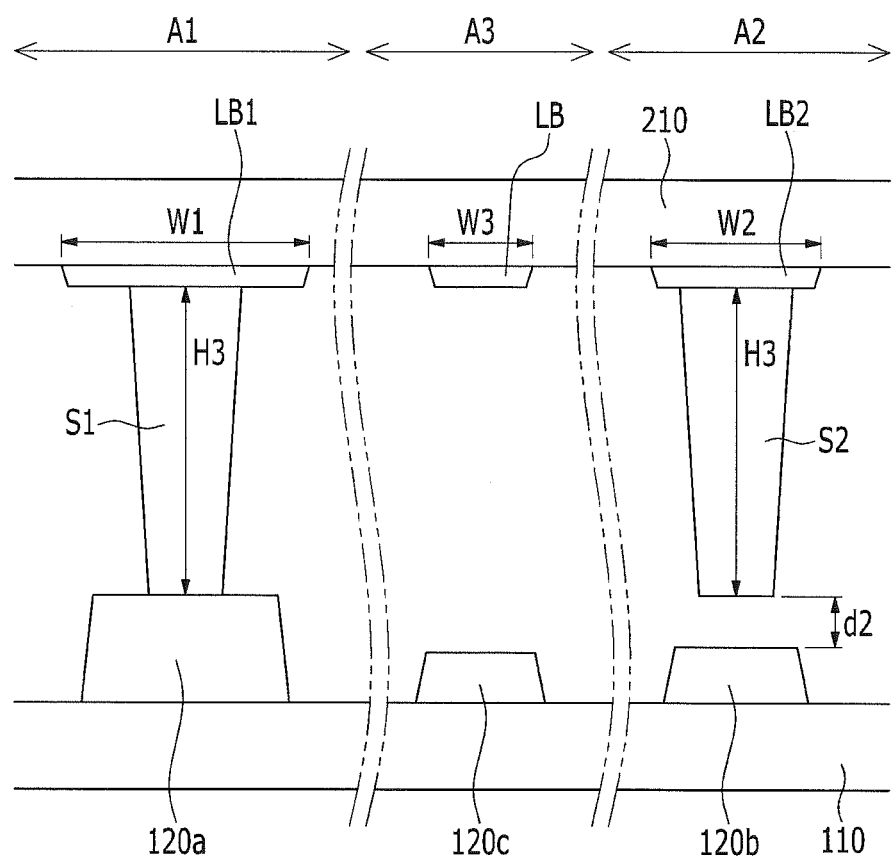
FIG. 19 is a cross-sectional view of portions of another alternative exemplary embodiment of the liquid crystal display according to the invention.

Then, another alternative exemplary embodiment of a liquid crystal display according to the invention will be described with reference to FIG. 19 as well as FIGS. 1 to 11. FIG. 19 is a cross-sectional view of another alternative exemplary embodiment of a liquid crystal display according to the invention.

The exemplary embodiment of the liquid crystal display shown in FIG. 19 is similar to the exemplary embodiments of the liquid crystal display described with reference to FIG. 15.

In an exemplary embodiment, as shown in FIG. 19, the liquid crystal display includes a first substrate 110 and a second substrate 210 disposed opposite to, e.g., facing the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

In such an embodiment, the first extension LB1 of the light blocking member LB overlaps the first spacer S1, and at least a portion of the second extension LB2 of the light blocking member LB overlaps the second spacer S2.

The first spacer S1 contacts a top layer of the first substrate 110 and the first extension LB1 on the second substrate 210 disposed opposite to, e.g., facing the first substrate 110, and the second spacer S2 is disposed spaced apart from the top layer of the first substrate 110 opposite thereto by a second distance d2.

In an exemplary embodiment, as shown in FIG. 19, the first spacer S1 and the second spacer S2 have third heights H3 that are substantially the same as each other.

A plurality of thin film layers, e.g., an first thin film layer 120a, a second thin film layer 120b and a third thin film layer 120c, is disposed on the first substrate 110 that faces the first spacer S1 and the second spacer S2. In such an embodiment, a height of the first thin film layer 120a disposed in a first region A1 where the first extension LB1 of the light blocking member LB is disposed is greater than a height of the second thin film layer 120b disposed in a second region A2 where the second extension LB2 of the light blocking member LB is disposed.

In such an embodiment, where the first spacer S1 and the second spacer S2 have the third heights H3 that are substantially the same as each other, due to a difference in heights between the thin film layers 120a, 120b and 120c, the first spacer S1 contacts the first thin film layer 120a on the first substrate 110 and the first extension LB1 on the second substrate 210, and the second spacer S2 is spaced from the second thin film layer 120b on the first substrate 110 opposite thereto by a second distance d2.

In an exemplary embodiment of the liquid crystal display, as shown in FIG. 19, the width W1 of the first extension LB1 of the light blocking member LB is greater than the width W2 of the second extension LB2. In such an embodiment, similarly to the exemplary embodiments described above, the width W1 of the first extension LB1 of the light blocking member LB and the width W2 of the second extension LB2 are greater than the width W3 of the light blocking member LB.

Other features of the liquid crystal displays described above may be applied to the exemplary embodiment of the liquid crystal display of FIG. 19.

Figure 20:
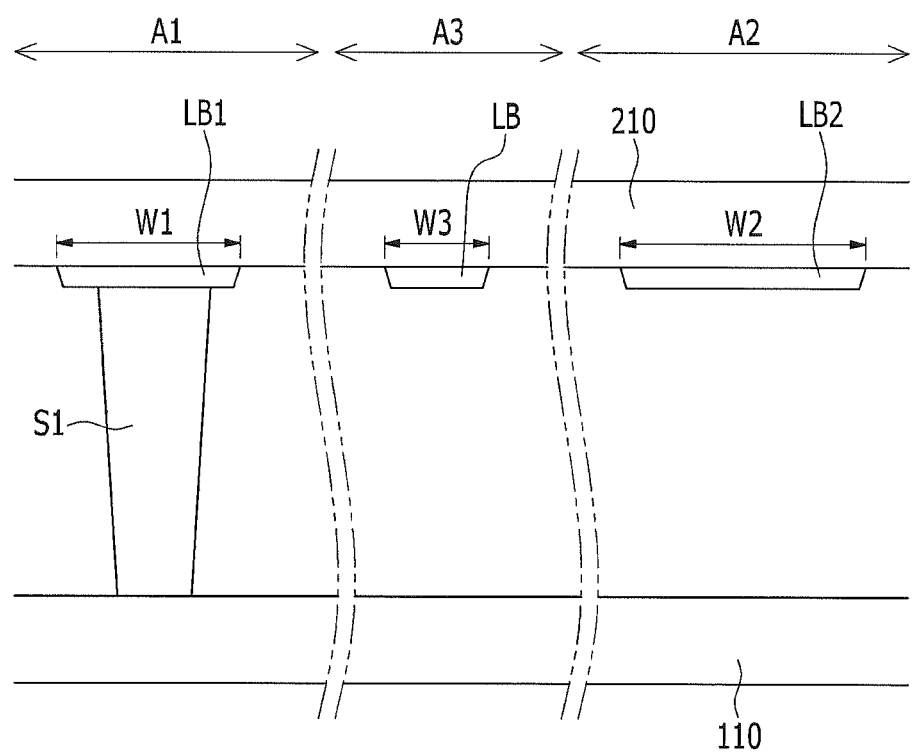
FIG. 20 is a cross-sectional view of portions of another alternative exemplary embodiment of the liquid crystal display according to the invention.

Then, another alternative exemplary embodiment of a liquid crystal display the invention will be described with reference to FIG. 20 as well as FIGS. 1 to 11. FIG. 20 is a cross-sectional view of another alternative exemplary embodiment of a liquid crystal display according to the invention.

The exemplary embodiment of the liquid crystal display shown in FIG. 20 is similar to the exemplary embodiment of the liquid crystal display illustrated in FIG. 12.

In an exemplary embodiment, as shown in FIG. 20, the liquid crystal display according to the exemplary embodiment includes a first substrate 110 and a second substrate 210 disposed opposite to, e.g., facing the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

The light blocking member LB, and the first extension LB1 and the second extension LB2 of the light blocking member LB are disposed on, e.g., attached to, the second substrate 210. The first extension LB1 and the second extension LB2 of the light blocking member LB disposed on, e.g., attached to, the second substrate 210 may be extensions of a black matrix.

The first extension LB1 of the light blocking member LB overlaps the first spacer S1, and the second extension LB2 of the light blocking member LB does not overlap the first spacer S1.

In an exemplary embodiment of the liquid crystal display, as shown in FIG. 20, the width W1 of the first extension LB1 of the light blocking member LB is less than the width W2 of the second extension LB2. In such an embodiment, similarly to the exemplary embodiments described above, the width W1 of the first extension LB1 of the light blocking member LB and the width W2 of the second extension LB2 are greater than the width W3 of the light blocking member LB.

An exemplary embodiment of the liquid crystal display according to the invention has the light blocking member LB including the first extension LB1 and the second extension LB2 disposed in a display area including a plurality of pixel PX areas, and the first extension LB1 of the light blocking member LB overlaps the first spacer S1, and the second extension LB2 of the light blocking member LB does not overlap the first spacer S1.

In such an embodiment, deterioration in display quality such as spots by blocking light leakage that may occur due to the first spacer S1 by the first extension LB1 of the light blocking member LB is effectively prevented and a difference in an aperture ratio between the pixel PX including the region A1 with the first spacer S1 and the pixel PX including the region A2 without the first spacer S1 is substantially reduced.

In an exemplary embodiment of the liquid crystal display, the first spacer S1 is disposed on, e.g., attached to, the second substrate 210, but not being limited thereto. In an alternative exemplary embodiment of the liquid crystal display according to the invention, the first spacer S1 may be disposed on, e.g., attached to, the first substrate 110.

Other features of the liquid crystal displays described above may be applied to the exemplary embodiment of the liquid crystal display of FIG. 20.

Figure 21:
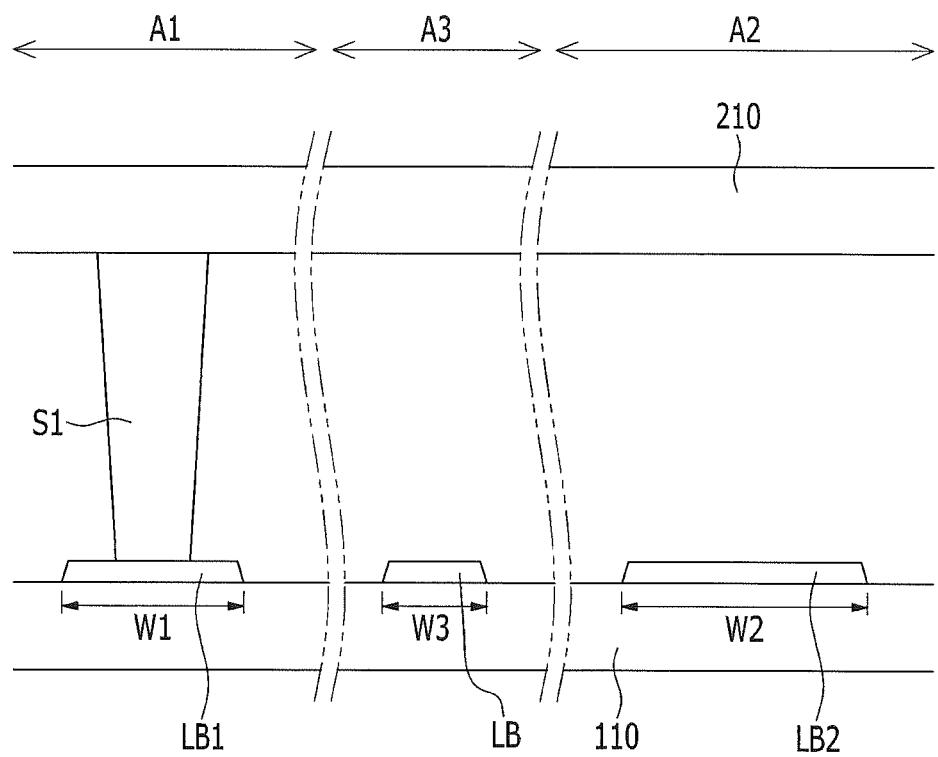
FIG. 21 is a cross-sectional view of portions of another alternative exemplary embodiment of the liquid crystal display according to the invention.

Then, another alternative exemplary embodiment of a liquid crystal display according to the invention will be described with reference to FIG. 21 as well as FIGS. 1 to 11. FIG. 21 is a cross-sectional view of another alternative exemplary embodiment of a liquid crystal display according to the invention.

The exemplary embodiment of the liquid crystal display shown in FIG. 21 is similar to the exemplary embodiment of the liquid crystal display described with reference to FIG. 13.

In an exemplary embodiment, as show in FIG. 21, the liquid crystal display includes a first substrate 110 and a second substrate 210 disposed opposite to, e.g., facing the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

In such an embodiment, the first extension LB1 of the light blocking member LB overlaps the first spacer S1, and the second extension LB2 of the light blocking member LB does not overlap the first spacer S1.

In an exemplary embodiment of the liquid crystal, the first extension LB1 and the second extension LB2 of the light blocking member LB are disposed on, e.g., attached to, the first substrate 110. Although not illustrated, the first extension LB1 and the second extension LB2 of the light blocking member LB may be extensions of a gate conductor provided on the same layer as a gate line disposed on the first substrate 110 or a data conductor provided on the same layer as a data line.

In an exemplary embodiment of the liquid crystal display, as shown in FIG. 21, the width W1 of the first extension LB1 of the light blocking member LB is less than the width W2 of the second extension LB2. In such an embodiment, similarly to the exemplary embodiments described above, the width W1 of the first extension LB1 of the light blocking member LB and the width W2 of the second extension LB2 are greater than the width W3 of the light blocking member LB.

In an exemplary embodiment, as shown in FIG. 21, the light blocking member LB disposed in the third region A3 is disposed on, e.g., attached to, the first substrate 110, but not being limited thereto. In an alternative exemplary embodiment of a liquid crystal display according to the invention, the light blocking member LB disposed in the third region A3 may be disposed on, e.g., attached to, the second substrate 210, not the first substrate 110.

In an exemplary embodiment of the liquid crystal display, as shown in FIG. 21, the first spacer S1 is deposed on, e.g., attached to, the second substrate 210, but not being limited thereto. In an alternative exemplary embodiment of a liquid crystal display according to the invention, the first spacer S1 may be disposed on, e.g., attached to, the first substrate 110.

Other features of the liquid crystal displays described above may be applied to the exemplary embodiment of the liquid crystal display of FIG. 21.

Figure 22:
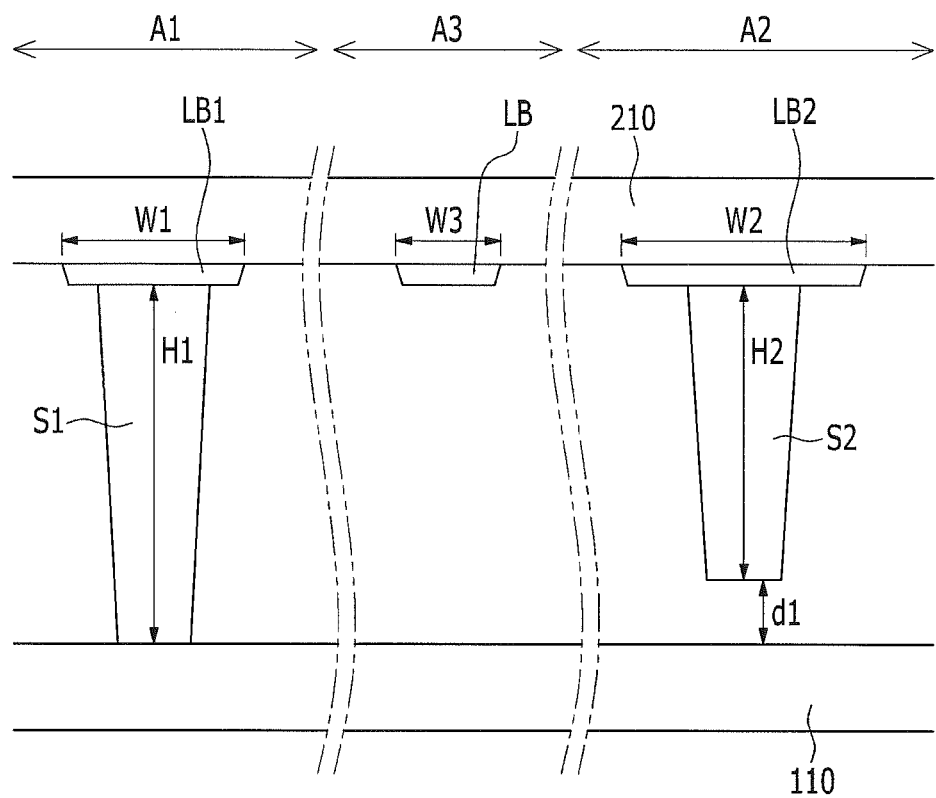
FIG. 22 is a cross-sectional view of portions of another alternative exemplary embodiment of the liquid crystal display according to the invention.

Then, another alternative exemplary embodiment of a liquid crystal display according to the invention will be described with reference to FIG. 22 as well as FIGS. 1 to 11. FIG. 22 is a cross-sectional view of another alternative exemplary embodiment of a liquid crystal display according to the invention.

The exemplary embodiment of the liquid crystal display shown in FIG. 22 is similar to the exemplary embodiment of the liquid crystal display described with reference to FIG. 14.

In an exemplary embodiment, as shown in FIG. 22, the liquid crystal display includes a first substrate 110 and a second substrate 210 disposed opposite to, e.g., facing the first substrate 110. In such an embodiment, the liquid crystal display according to the exemplary embodiment includes a first extension LB1 of a light blocking member LB disposed in a first region A1, a second extension LB2 of the light blocking member LB disposed in a second region A2, and the light blocking member LB disposed in a third region A3.

In an exemplary embodiment of the liquid crystal display, as shown in FIG. 21, the first extension LB1 of the light blocking member LB overlaps the first spacer S1, and at least a portion of the second extension LB2 of the light blocking member LB overlaps the second spacer S2.

In such an embodiment, the first spacer S1 contacts the first substrate 110 and the first extension LB1 on the second substrate 210 disposed opposite to, e.g., facing the first substrate 110, and the second spacer S2 is disposed spaced apart from the first substrate 110 opposite thereto by a first distance d1.

In an exemplary embodiment, as shown in FIG. 22, the first spacer S1 has a first height H1, and the second spacer S2 has a second height H2. In such an embodiment, the first height H1 of the first spacer S1 is greater than the second height H2 of the second spacer S2.

In an exemplary embodiment of the liquid crystal display, as shown in FIG. 22, the width W1 of the first extension LB1 of the light blocking member LB is less than the width W2 of the second extension LB2. In such an embodiment, similarly to the exemplary embodiments described above, the width W1 of the first extension LB1 of the light blocking member LB and the width W2 of the second extension LB2 are greater than the width W3 of the light blocking member LB.

In an alternative exemplary embodiment of the liquid crystal display according to the invention, the height of the first spacer S1 may be less than the height of the second spacer S2. In another alternative exemplary embodiment of the liquid crystal display according to the invention, a width of the first spacer S1 may be different from a width of the second spacer S2, and plane shapes of the first spacer S1 and the second spacer S2 may be different from each other. In such an embodiment, the first spacer S1 and the second spacer S2 may have different widths or plane shapes, not have a same height.

Other features of the liquid crystal displays described above may be applied to the exemplary embodiment of the liquid crystal display of FIG. 22.

Figure 23:
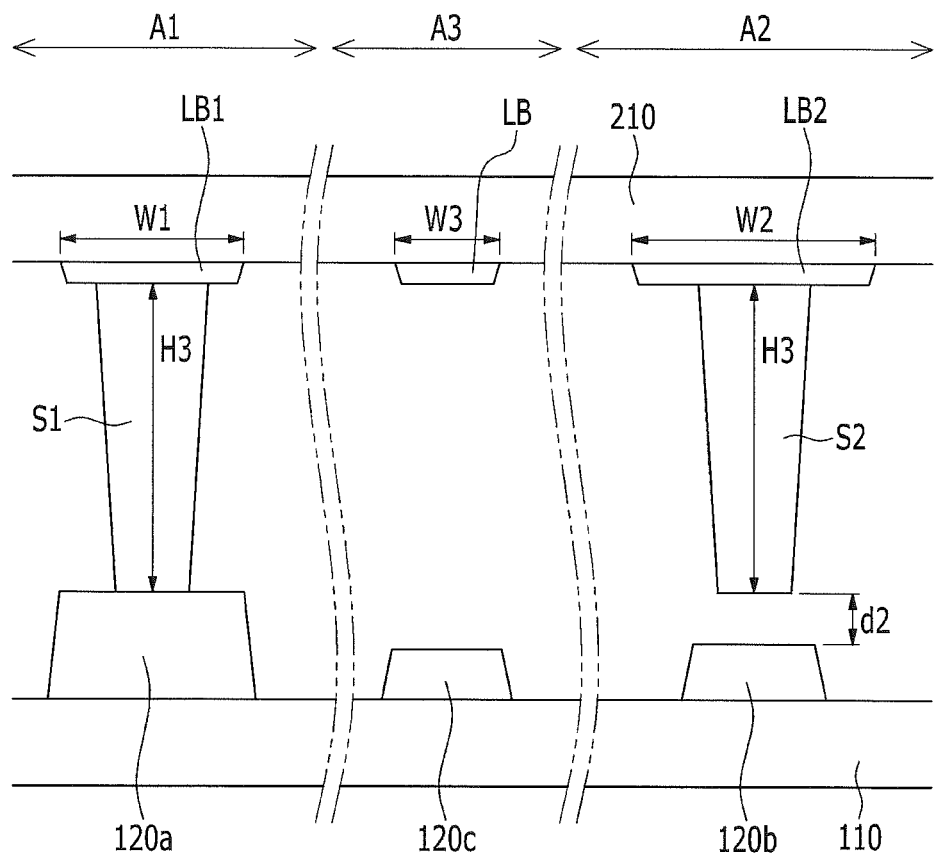
FIG. 23 is a cross-sectional view of portions of another alternative exemplary embodiment of the liquid crystal display according to the invention.

Then, another alternative exemplary embodiment of a liquid crystal display according to the invention will be described with reference to FIG. 23 as well as FIGS. 1 to 11. FIG. 23 is a cross-sectional view of another alternative exemplary embodiment of a liquid crystal display according to the invention.

The exemplary embodiment of the liquid crystal display shown in FIG. 23 is similar to the exemplary embodiment of the liquid crystal display described with reference to FIG. 15.

In an exemplary embodiment, as shown in FIG. 23, The liquid crystal display includes a first substrate 110 and a second substrate 210 disposed opposite to, e.g., facing the first substrate 110. In such an embodiment, the liquid crystal display includes a first extension LB1 of a light blocking member LB disposed in a first region A1, a second extension LB2 of the light blocking member LB disposed in a second region A2, and the light blocking member LB disposed in a third region A3.

In such an embodiment, the first extension LB1 of the light blocking member LB overlaps the first spacer S1, and at least a portion of the second extension LB2 of the light blocking member LB overlaps the second spacer S2.

The first spacer S1 contacts a layer on the first substrate 110 and the first extension LB1 on the second substrate 210 disposed opposite to, e.g., facing the first substrate 110, and the second spacer S2 is disposed spaced apart from a layer on the first substrate 110 opposite thereto by a second distance d2.

In an exemplary embodiment, as shown in FIG. 23, the first spacer S1 and the second spacer S2 have third heights H3 that are substantially the same as each other.

A plurality of thin film layers, e.g., a first thin film layer 120a, a second thin film layer 120b and a third thin film layer 120c, is disposed on the first substrate 110 that faces the first spacer S1 and the second spacer S2. In such an embodiment, a height of the first thin film layer 120a disposed in a first region A1 where the first extension LB1 of the light blocking member LB is disposed is greater than a height of the second thin film layer 120b disposed in a second region A2 where the second extension LB2 of the light blocking member LB is disposed.

In such an embodiment, where the first spacer S1 and the second spacer S2 have third heights H3 that are substantially the same as each other, due to a difference in heights of the thin film layers 120a, 120b and 120c, the first spacer S1 contacts the first thin film layer 120a on the first substrate 110 and the first extension on the second substrate 210, and the second spacer S2 is spaced apart from the second thin film layer 120b on the first substrate 110 opposite thereto by a second distance d2.

In an exemplary embodiment of the liquid crystal display, as shown in FIG. 23, the width W1 of the first extension LB1 of the light blocking member LB is less than the width W2 of the second extension LB2. In such an embodiment, similarly to the exemplary embodiments described above, the width W1 of the first extension LB1 of the light blocking member LB and the width W2 of the second extension LB2 are greater than the width W3 of the light blocking member LB.

In an alternative exemplary embodiment of the liquid crystal display according to the invention, a height of the first spacer S1 may be different from a height of the second spacer S2. In such an embodiment, a difference in the distance between the first and second spacers S1 and S2 and the first and second thin film layers 120a and 120b on the first substrate 110 opposite thereto may be determined by a step generated by the height difference between the first spacer S1 and the second spacer S2 and the height difference between the thin film layers 120a, 120b and 120c.

Other features of the liquid crystal displays described above may be applied to the exemplary embodiment of the liquid crystal display of FIG. 23.

As described herein, an exemplary embodiment of the liquid crystal display according to the invention has the light blocking members LB including the first extensions LB1 and the second extensions LB2 disposed in a display area including a plurality of pixel PX areas, and the first extensions LB1 of the light blocking members LB overlaps the first spacers S1, and the second extensions LB2 of the light blocking members LB does not overlaps the first spacers S1.

In such an embodiment, deterioration in display quality such as spots by blocking light leakage that may occur due to the first spacer S1 by the first extension LB1 of the light blocking member LB is effectively prevented and a difference in an aperture ratio between the pixel PX including the region A1 with the first spacer S1 and the pixel PX including the region A2 without the first spacer S1 is substantially reduced.

Although not illustrated, an exemplary embodiment of the liquid crystal display described above may include a first field generating electrode provided on the first substrate 110 and a second field generating electrode provided on the second substrate 210. In an alternative exemplary embodiment, the liquid crystal display may include a first field generating electrode and a second field generating electrode disposed on the first substrate 110. In another alternative exemplary embodiment, the liquid crystal display may include a first field generating electrode and a second field generating electrode provided on the first substrate 110, and a third field generating electrode provided on the second substrate 210. The field generating electrodes may have plate-shaped plane shape and may include a plurality of branch electrodes. In an exemplary embodiment, the liquid crystal displays may be a plane to line switching ("PLS") mode liquid crystal display, an in plane switching ("IPS") mode liquid crystal display, or a twisted nematic ("TN") mode liquid crystal display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a second substrate disposed opposite to the first substrate;
a light blocking member disposed on the first substrate or the second substrate, wherein the light blocking member is disposed in a display area comprising a plurality of pixel areas arranged substantially in a matrix form, and the light blocking member comprises an extension having a predetermined plane shape; and
a plurality of spacers comprising a first spacer disposed on one of the first substrate or the second substrate,
wherein
the extension of the light blocking member comprises a first extension and a plurality of second extensions,
the first extension overlaps the first spacer, and at least one of the second extensions does not overlap any of the spacers, and
wherein the plurality of pixel areas comprises:
a first pixel area which overlaps the first extension;
a second pixel area which overlaps one of the second extensions; and
a third pixel area which does not overlap the extension of the light blocking member and is disposed between the first pixel area and the second pixel area,
wherein the first pixel area, the second pixel area, and the third pixel area are disposed in a same row.

2. The liquid crystal display of claim 1, wherein
a width of the first extension is substantially the same as a width of the second extensions.

3. The liquid crystal display of claim 2, wherein
the light blocking member is a black matrix.

4. The liquid crystal display of claim 3, wherein the spacers further comprise:
a second spacer disposed on the one of the first substrate and the second substrate,
wherein at least one of the second extensions overlaps the second spacer.

5. The liquid crystal display of claim 4, wherein
a height of the first spacer and a height of the second spacer are different from each other.

6. The liquid crystal display of claim 5, wherein
widths of the first spacer and the second spacer are different from each other.

7. The liquid crystal display of claim 5, wherein the height of the first spacer is greater than the height of the second spacer.

8. The liquid crystal display of claim 4, wherein
a height of the first spacer and a height of the second spacer are substantially the same as each other.

9. The liquid crystal display of claim 8, wherein
widths of the first spacer and the second spacer are different from each other.

10. The liquid crystal display of claim 8, wherein the height of the first spacer is greater than the height of the second spacer.

11. The liquid crystal display of claim 2, wherein
edges of the extension of the light blocking member have plane shapes including a curved line or a straight line.

12. The liquid crystal display of claim 11, wherein
a portion defined by the edges of the extension of the light blocking member has a circular, oval, or polygonal plane shape.

13. The liquid crystal display of claim 11, wherein
the extension of the light blocking member is disposed overlapping a plurality of adjacent pixel areas, and
an overlapping area of the extension and one pixel area of the plurality of adjacent pixel areas is different from an overlapping area of the extension and another pixel area of the plurality of adjacent pixel areas.

14. The liquid crystal display of claim 11, wherein
a plane shape of a portion defined by the edges of the extension is substantially the same as a plane shape of the first spacer.

15. The liquid crystal display of claim 2, wherein
the first extension and the second extensions are disposed in a same layer as a gate line disposed on the first substrate or disposed in a same layer as a data line disposed on the first substrate.

16. The liquid crystal display of claim 15, wherein the spacers further comprise:
a second spacer disposed on the one of the first substrate and the second substrate,
wherein at least one of the second extensions overlaps the second spacer.

17. The liquid crystal display of claim 16, wherein
a height of the first spacer and a height of the second spacer are different from each other.

18. The liquid crystal display of claim 17, wherein
widths of the first spacer and the second spacer are different from each other.

19. The liquid crystal display of claim 17, wherein the height of the first spacer is greater than the height of the second spacer.

20. The liquid crystal display of claim 16, wherein
a height of the first spacer and a height of the second spacer are substantially the same as each other.

21. The liquid crystal display of claim 20, wherein
widths of the first spacer and the second spacer are different from each other.

22. The liquid crystal display of claim 20, wherein the height of the first spacer is greater than the height of the second spacer.

23. The liquid crystal display of claim 1, wherein
a width of the first extension is different from a width of the second extensions.

24. The liquid crystal display of claim 23, wherein
the light blocking member is a black matrix.

25. The liquid crystal display of claim 24, wherein the spacers further comprise:
a second spacer disposed on the one of the first substrate and the second substrate,
wherein at least one of the second extensions overlaps the second spacer.

26. The liquid crystal display of claim 25, wherein
a height of the first spacer and a height of the second spacer are different from each other.

27. The liquid crystal display of claim 26, wherein
widths of the first spacer and the second spacer are different from each other.

28. The liquid crystal display of claim 26, wherein the height of the first spacer is greater than the height of the second spacer.

29. The liquid crystal display of claim 25, wherein
a height of the first spacer and a height of the second spacer are substantially the same as each other.
30. The liquid crystal display of claim 29, wherein widths of the first spacer and the second spacer are different from each other.
31. The liquid crystal display of claim 29, wherein the height of the first spacer is greater than the height of the second spacer.
32. The liquid crystal display of claim 23, wherein
edges of the extension of the light blocking member have plane shapes including a curved line or a straight line.
33. The liquid crystal display of claim 32, wherein
a portion defined by the edges of the extension of the light blocking member has a circular, oval, or polygonal plane shape.
34. The liquid crystal display of claim 32, wherein
the extension of the light blocking member is disposed overlapping a plurality of adjacent pixel areas, and
an overlapping area of the extension and one pixel area of the plurality of adjacent pixel areas is different from an overlapping area of the extension and another pixel area of the plurality of adjacent pixel areas.
35. The liquid crystal display of claim 32, wherein
a plane shape of the extension is substantially the same as a plane shape of the first spacer.
36. The liquid crystal display of claim 35, wherein
the first extension and the second extensions are disposed in a same layer as a gate line disposed on the first substrate or disposed in a same layer as a data line disposed on the first substrate.
37. The liquid crystal display of claim 36, wherein the spacers further comprise:
a second spacer disposed on the one of the first substrate and the second substrate,
wherein at least one of the second extensions overlaps the second spacer.
38. The liquid crystal display of claim 37, wherein
a height of the first spacer and a height of the second spacer are different from each other.
39. The liquid crystal display of claim 38, wherein
widths of the first spacer and the second spacer are different from each other.
40. The liquid crystal display of claim 38, wherein the height of the first spacer is greater than the height of the second spacer.
41. The liquid crystal display of claim 37, wherein
a height of the first spacer and a height of the second spacer are substantially the same as each other.
42. The liquid crystal display of claim 41, wherein
widths of the first spacer and the second spacer are different from each other.
43. The liquid crystal display of claim 41, wherein the height of the first spacer is greater than the height of the second spacer.
44. The liquid crystal display of claim 1, wherein
edges of the extension of the light blocking member have plane shapes including a curved line or a straight line.
45. The liquid crystal display of claim 44, wherein
a portion defined by the edges of the extension of the light blocking member has a circular, oval, or polygonal plane shape.
46. The liquid crystal display of claim 44, wherein
the extension of the light blocking member is disposed overlapping a plurality of adjacent pixel areas, and
an overlapping area of the extension and one pixel area of the plurality of adjacent pixel areas is different from an overlapping area of the extension and another pixel area of the plurality of adjacent pixel areas.
47. The liquid crystal display of claim 44, wherein
a plane shape of the extension is substantially the same as a plane shape of the first spacer.

\* \* \* \* \*